United States Patent [19]

Fukinuki et al.

[11] Patent Number: 4,885,631
[45] Date of Patent: Dec. 5, 1989

[54] HIGH RESOLUTION COLOR TELEVISION SIGNAL TRANSMISSION SYSTEM AND RECEIVER UTILIZING MOTION INFORMATION OF A PICTURE

[75] Inventors: Takahiko Fukinuki, Kokubunji; Yasuhiro Hirano, Hachioji; Hiroshi Yoshigi, Nishitama; Hidehiko Jusa, Kokubunji, all of Japan

[73] Assignee: Hitachi, Ltd., Tokyo, Japan

[21] Appl. No.: 233,975

[22] Filed: Aug. 19, 1988

Related U.S. Application Data

[63] Continuation of Ser. No. 29,970, Mar. 25, 1987, abandoned, which is a continuation-in-part of Ser. No. 578,528, Feb. 9, 1984, Pat. No. 4,660,072, and a continuation-in-part of Ser. No. 26,281, Mar. 16, 1986, Pat. No. 4,745,460.

[30] Foreign Application Priority Data

Mar. 18, 1983 [JP] Japan .................................. 58-44238

[51] Int. Cl.⁴ .......................... H04N 9/64; H04N 9/78
[52] U.S. Cl. .................................... 358/21 R; 358/11; 358/31; 358/105
[58] Field of Search ................. 358/21 R, 105, 31, 11, 358/12

[56] References Cited

U.S. PATENT DOCUMENTS

| | | | |
|---|---|---|---|
| 2,716,151 | 8/1955 | Smith | 358/12 |
| 4,322,750 | 3/1982 | Lord et al. | 358/140 |
| 4,530,004 | 7/1985 | Achiha et al. | 358/31 |
| 4,620,225 | 10/1986 | Wendland et al. | 358/12 |
| 4,626,891 | 12/1986 | Achiha | 358/105 |
| 4,626,895 | 12/1986 | Reitmeier | 358/31 |
| 4,639,767 | 1/1987 | Suzuki | 358/105 |
| 4,660,072 | 4/1987 | Fukinuki | 358/12 |
| 4,670,773 | 6/1987 | Silverberg | 358/12 |
| 4,760,446 | 7/1988 | Ninomiya et al. | 358/105 |

OTHER PUBLICATIONS

Wendland, Signal Processing for Compatible HDTV-Systems, First Results, High Definition Television Colloquium 82, 1982.
Fukinuki et al., Extended Definition TV Fully Compatible with Existing Standards.

Primary Examiner—John W. Shepperd
Attorney, Agent, or Firm—Antonelli, Terry & Wands

[57] ABSTRACT

A television signal transmission system having an improved receiver which system is capable of transmitting a wide-band television video signal in a frequency band narrower than the frequency band of the television video signal is a multiplex video signal and the receiver reproduces a luminance signal and color signal from the multiplexed video signal. The receiver includes a motion detector for detecting motion information of a picture from the multiplex video signal and a separator for separating signals in response to the detected motion information to thereby form a picture of high quality utilizing the motion information.

6 Claims, 40 Drawing Sheets f : TIME FREQUENCY
ν : VERTICAL FREQUENCY
μ : HORIZONTAL FREQENCY μ < 2MHz

FIG. 28

ROM-1 TABLE

| $A_0$ | $A_1$ | $A_2$ | $A_3$ | $A_4$ | $A_5$ | $A_6$ | $A_7$ | $A_8$ | $A_9$ | $O_0$ | $O_1$ | $O_2$ |
|---|---|---|---|---|---|---|---|---|---|---|---|---|
| 1 | 1 | 1 | 1 | 0 | 0 | 0 | 0 | 0 | 0 | 0 | 0 | 0 |
| 0 | 1 | 1 | 1 | 1 | 0 | 0 | 0 | 0 | 0 | 1 | 0 | 0 |
| 0 | 0 | 1 | 1 | 1 | 1 | 0 | 0 | 0 | 0 | 0 | 1 | 0 |
| 0 | 0 | 0 | 1 | 1 | 1 | 1 | 0 | 0 | 0 | 1 | 1 | 0 |
| 0 | 0 | 0 | 0 | 1 | 1 | 1 | 1 | 0 | 0 | 0 | 0 | 1 |
| 1 | 0 | 0 | 0 | 0 | 1 | 1 | 1 | 0 | 0 | 1 | 0 | 1 |
| 1 | 1 | 0 | 0 | 0 | 0 | 1 | 1 | 0 | 0 | 0 | 1 | 1 |
| 1 | 1 | 1 | 0 | 0 | 0 | 0 | 1 | 0 | 0 | 1 | 1 | 1 |
| x | x | x | x | x | x | x | x | 1 | x | 0 | 0 | 0 |
| x | x | x | x | x | x | x | x | x | 1 | 0 | 0 | 0 |

LINE NO.

| N | | | N+1 | | | N+2 | | | N+3 | | |
|---|---|---|---|---|---|---|---|---|---|---|---|
| $O_0$ | $O_1$ | $O_2$ | $O_0$ | $O_1$ | $O_2$ | $O_0$ | $O_1$ | $O_2$ | $O_0$ | $O_1$ | $O_2$ |
| 0 | 0 | 0 | 0 | 1 | 1 | 0 | 0 | 1 | 0 | 1 | 0 |
| 1 | 0 | 0 | 1 | 1 | 1 | 1 | 0 | 1 | 1 | 1 | 0 |
| 0 | 1 | 0 | 0 | 0 | 0 | 0 | 1 | 1 | 0 | 0 | 1 |
| 1 | 1 | 0 | 1 | 0 | 0 | 1 | 1 | 1 | 1 | 0 | 1 |
| 0 | 0 | 1 | 0 | 1 | 0 | 0 | 0 | 0 | 0 | 1 | 1 |
| 1 | 0 | 1 | 1 | 1 | 0 | 1 | 0 | 0 | 1 | 1 | 1 |
| 0 | 1 | 1 | 0 | 0 | 1 | 0 | 1 | 0 | 0 | 0 | 0 |
| 1 | 1 | 1 | 1 | 0 | 1 | 1 | 1 | 0 | 1 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |

ROM-2 TABLE

| $A_8$ $A_9$ $A_{10}$ | INPUT | OUTPUT |
|---|---|---|
| 0 0 0 | Din | 0 |
| 1 0 0 | Din | 0.707Din |
| 0 1 0 | Din | Din |
| 1 1 0 | Din | 0.707Din |
| 0 0 1 | Din | 0 |
| 1 0 1 | Din | −0.707Din |
| 0 1 1 | Din | −Din |
| 1 1 1 | Din | −0.707Din |

| INTERPOLATION MODE | CHARACTERISTIC OF INTERPOLATION FILTER | |
|---|---|---|
| IP$_1$ | $\cos^2 \pi \frac{f}{2fm}$ | $\hat{X}_0 = \frac{1}{2}(X_{-262} + X_{263})$ |
| IP$_2$ | $\cos^2 \pi \frac{f}{2fm}(Hs^{12}\pi\frac{f}{2fm})\cos^2\pi\frac{\nu}{2\nu_1}(Hs^{12}\pi\frac{\nu}{2\nu_1})$ | |
| IP$_3$ | $\cos^2 \pi \frac{\nu}{2\nu_1}$ | $\hat{X}_0 = \frac{1}{2}(X_0 + X_1)$ |

$fm = 30Hz$, $\nu_1 = \frac{525}{2}$ $\quad \nu$: VERTICAL FREQU.

D: DELAY
A: ADDER
M: MULTIPLIER

| S₁ | S₂ | IPY | IPC | |
|---|---|---|---|---|
| M0 (STILL) | X | IP1 | IP1 | (STILL MODE) |
| M1, M2 (MOVE) | 1 | IP2 | IP3 | (QUASI STILL MODE) |
| | 0 | IP3 | IP3 | (MOVE MODE) |

FIG. 41
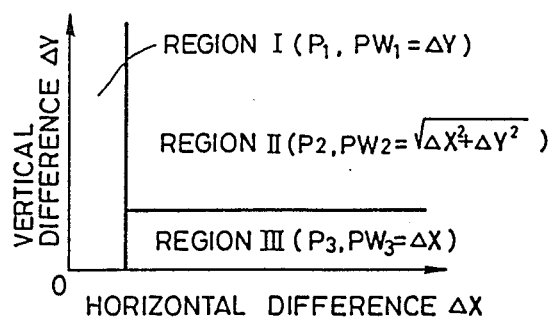
FIG. 42A  FIG. 42B  FIG. 42C
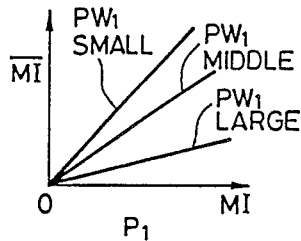 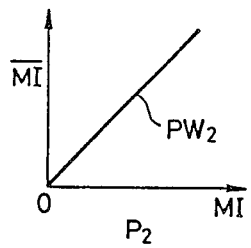 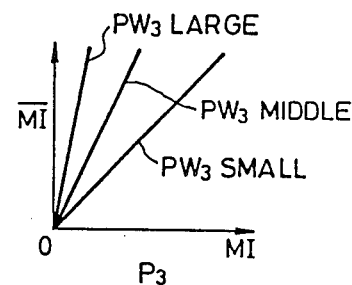
FIG. 42D  FIG. 42E  FIG. 42F
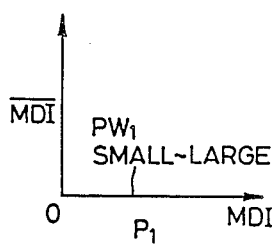 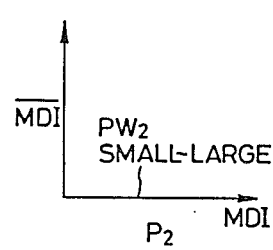 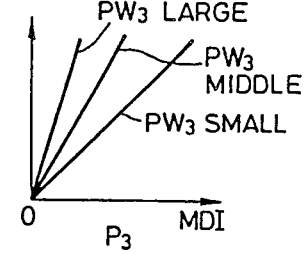
FIG. 43
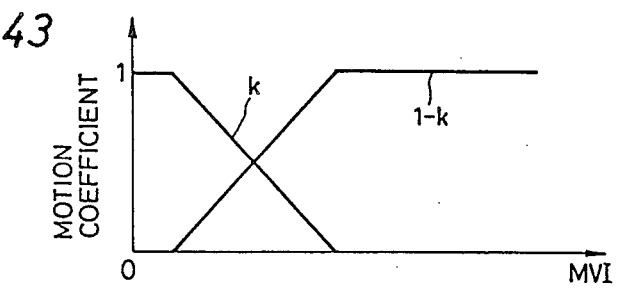

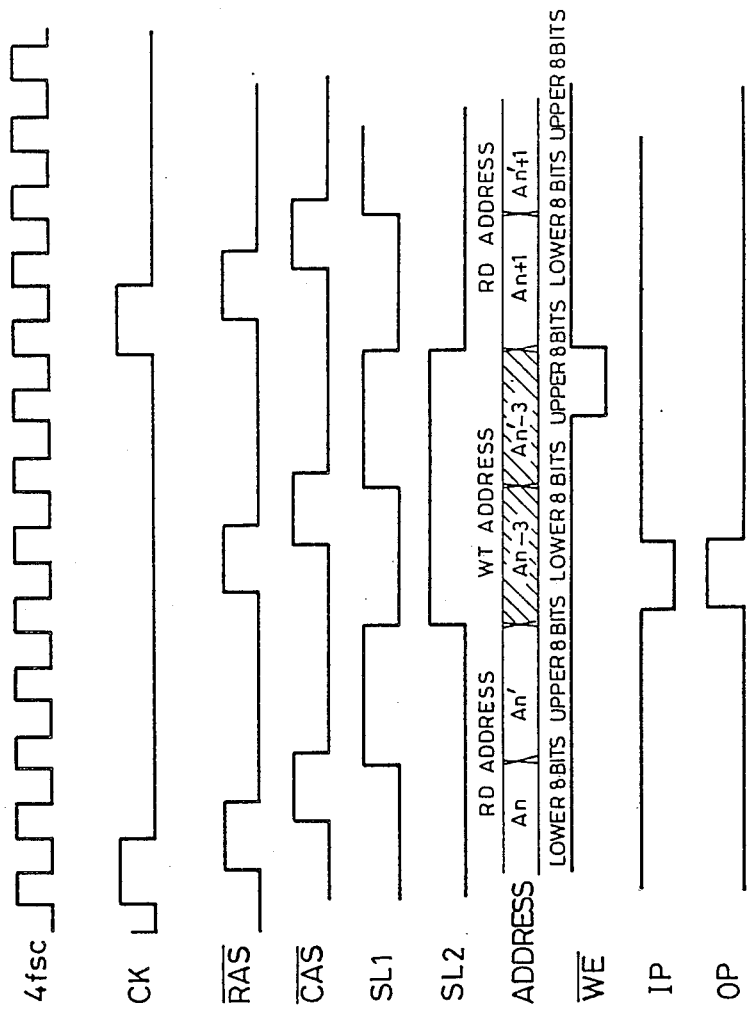

HIGH RESOLUTION COLOR TELEVISION SIGNAL TRANSMISSION SYSTEM AND RECEIVER UTILIZING MOTION INFORMATION OF A PICTURE

This application is a continuation of application Ser. No. 029,970, filed Mar. 25, 1987 which is a continuation-in-part of application Ser. No. 578,528 filed Feb. 8, 1984 and which is issued as U.S. Pat. No. 4,660,072 and which is incorporated by reference herein, and a continuation-in-part of application Ser. No. 26,281 filed Mar. 16, 1986, now Pat. No. 4,745,460, which is a Division of application Ser. No. 578,528.

BACKGROUND OF THE INVENTION

(1) Field of the Invention

The present invention relates to a television signal transmission system, and more particularly, to a television signal transmission system in which a wide-band television video signal is transmitted in a frequency band narrower than the frequency band of the television video signal itself and is regenerated in a television receiver.

(2) Description of the Prior Art

Hitherto, the standard television signal employs a transmission frequency band which is limited according to standards; hence, there is a limit in the resolution of the picture which is reproduced from the television signal in a television receiver.

To improve the resolution of the reproduced television picture, it is necessary to widen the transmission frequency band thereby to make it possible to enlarge the frequency band for the signal. More specifically, while the signal frequency band is specified to be 4.2 MHz in the standard NTSC television system, it is necessary to transmit the television signal in a frequency band of 6.0 MHz, for example, if the resolution is to be improved.

However, such a change in the signal frequency bandwidth requires modification of all of the standard broadcasting equipment, television receivers, channel frequency assignments and so forth. Such modifications can be made technically but are extremely difficult to realize in actual practice.

SUMMARY OF THE INVENTION

Accordingly, it is an object of the present invention to provide a television signal transmission system which is capable of transmitting a wide-band television video signal in a frequency band narrower than the frequency band of the television video signal which is a multiplex video signal, and a receiver for reproducing a luminance signal and color signal from the multiplexed video signal, which receiver includes a motion detector for detecting motion information of a picture from the multiplex video signal and a separator for separating signals in response to the detected motion information.

It is another object of the present invention that the receiver of the television system utilizes motion information of a picture to generate an original television video signal and form a picture of high quality, the receiver having a motion detector which includes a first motion detecting circuit for detecting first motion information from a horizontal frequency component lower than the horizontal frequency component of a modulated color signal and a luminance signal of a frame difference signal between a first signal having motion which is to be detected and a second signal separated by a frame period from the first signal, and a second motion detecting circuit for detecting at least one of second motion information obtained from a sum of two of frame difference signals of two scanning lines vertically adjacent a line on which the first signal is included and third motion information obtained from two frame different signals on a scanning line having the same vertical position.

The above-mentioned and other features and objects of this invention will become more apparent by reference to the following description taken in connection with the accompanying drawings.

BRIEF DESCRIPTION OF THE DRAWINGS

FIG. 28 shows a table used for signal YH demodulation;

FIG. 41 shows a characteristic for explaining an operation of a pattern decision circuit 40;

FIG. 42 shows a characteristic for explaining an operation of a normalized circuit 40–38;

FIG. 43 shows a characteristic for explaining an operation of a motion coefficient generating circuit 40–39;

FIG. 50 shows a time chart for explaining an operation of a circuit shown in FIG. 49.

DETAILED DESCRIPTION OF THE PREFERRED EMBODIMENTS

For an understanding of the basic operation of the present invention, reference is made to FIGS. 1–7, 8a, 8b and 9 herein and the corresponding Figures and description in U.S. Pat. No. 4,660,072 incorporated by reference herein.

Figure 10:
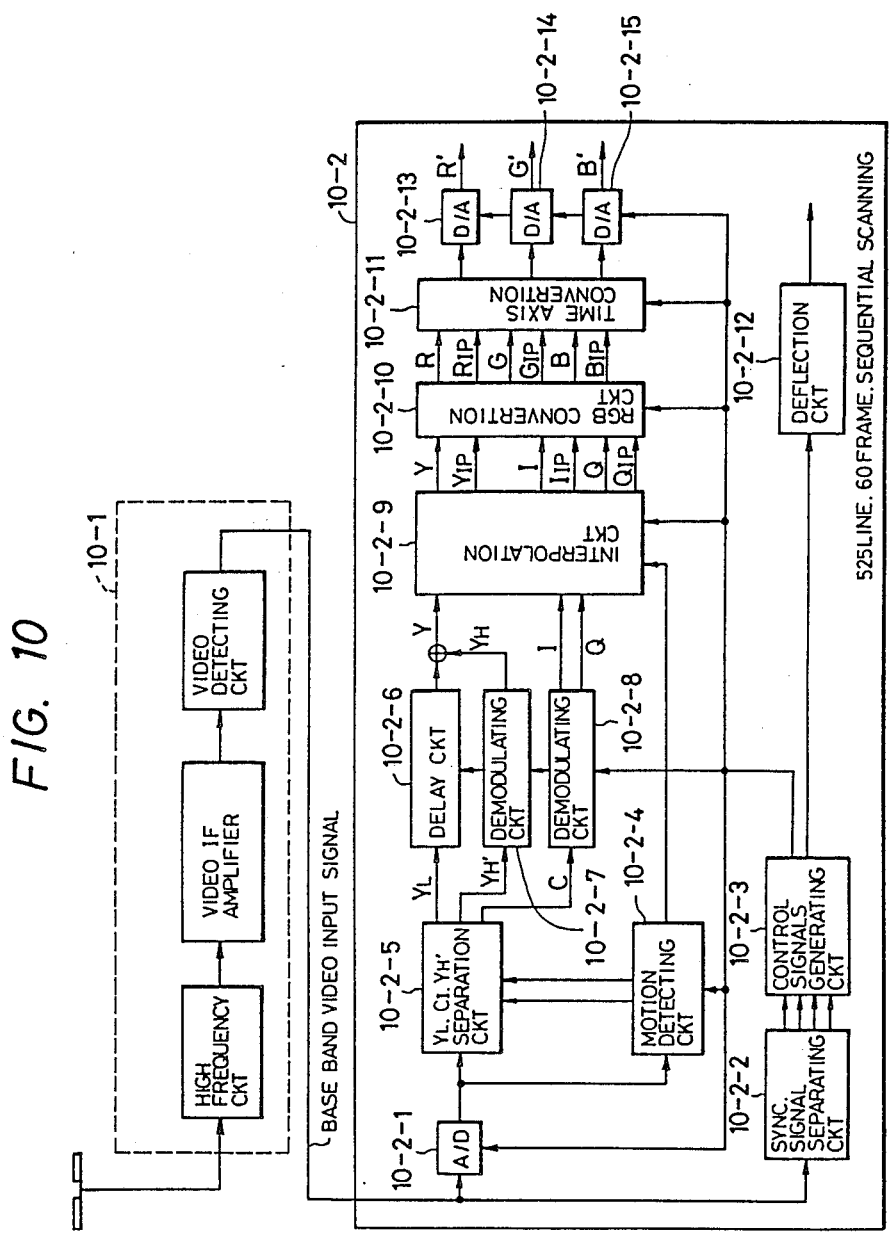
FIG. 10 is a block diagram illustrating a television receiver used in the present invention system.

FIG. 10 is a block diagram illustrating a television receiver used in the television signal transmission system according to an embodiment of the present invention. The part 10-1 surrounded by a dotted line is a signal processing part such as a high-frequency circuit, a video IF amplifier circuit or a video detector, which converts a broadcast wave into a video signal of the base band. The signal processing part is constructed in the same manner as that of a generally used television receiver, and is not described here.

A part 10-2 surrounded by a solid line is a signal processing unit constructed in accordance with the present invention. A video signal of the base band obtained from the video detector or a video signal of the video band that has been formed already, is input to an A/D converter 10-2-1 and to a synchronizing signal separation circuit 10-2-2 which picks up a color subcarrier $f_{sc}$, a horizontal synchronizing signal HD, a vertical synchronizing signal VD, as well as frequency components of $4f_{sc}$ and $8f_{sc}$, that are locked to the video signal. A control signal generating circuit 10-2-3 generates signals required for each of the blocks relying upon the signals obtained from the synchronizing signal separating circuit 10-2-2.

An A/D converter 10-2-1 samples the signals at a sampling frequency $4f_{sc}$ and converts them into digital signals. A $Y_L$, C, $Y_H'$ separation circuit 10-2-5 separates the signals into a lower frequency component $Y_L$ of luminance signal, a chrominance signal C and a high-resolution signal $Y_H'$. In this case, a motion detecting circuit 10-2-4 detects the presence of motion, and performs the motion-adaptive separation processing as will be described later. The high-resolution signal $Y_H'$ that is separated is demodulated by a demodulating circuit 10-2-7 into the original higher frequency component $Y_H$ of luminance signal. This component is added to a signal $Y_L$ delayed by an amount of the demodulating circuit through a delay circuit 10-2-6, in order to form a luminance signal Y of a wide band. The chrominance signal C is demodulated by a demodulating circuit 10-2-8 into color difference signals I and Q.

An interpolation circuit 10-2-9 interpolates using interpolating signals $Y_{IP}$, $I_{IP}$ which are the scanning lines that are missing from the field due to interlaced scanning performed in the existing television systems. The signals Y, I and Q and the interpolating signals $Y_{IP}$, $I_{IP}$ and $Q_{IP}$ are converted into signals R, G, B and $R_{IP}$, $G_{IP}$ and $B_{IP}$ by a RGB conversion circuit 10-2-10 through a matrix operation. A time axis conversion circuit 10-2-11 converts the output of circuit 10-2-10 into the signals having 525 scanning lines, which is twice as great as the scanning frequency of the existing television, and having 60 frames, the signals being sequentially scanned. These signals are converted into analog signals R', G' and B' through D/A converters 10-2-13, 10-2-14 and 10-2-15, and are displayed through 60 frames and sequential scanning. A deflection circuit 10-2-12 generates control signals required for the display of 525 scanning lines, 60 frames and sequential scanning.

Structures of the above-mentioned blocks will now be described in detail by way of embodiments.

Figure 11:
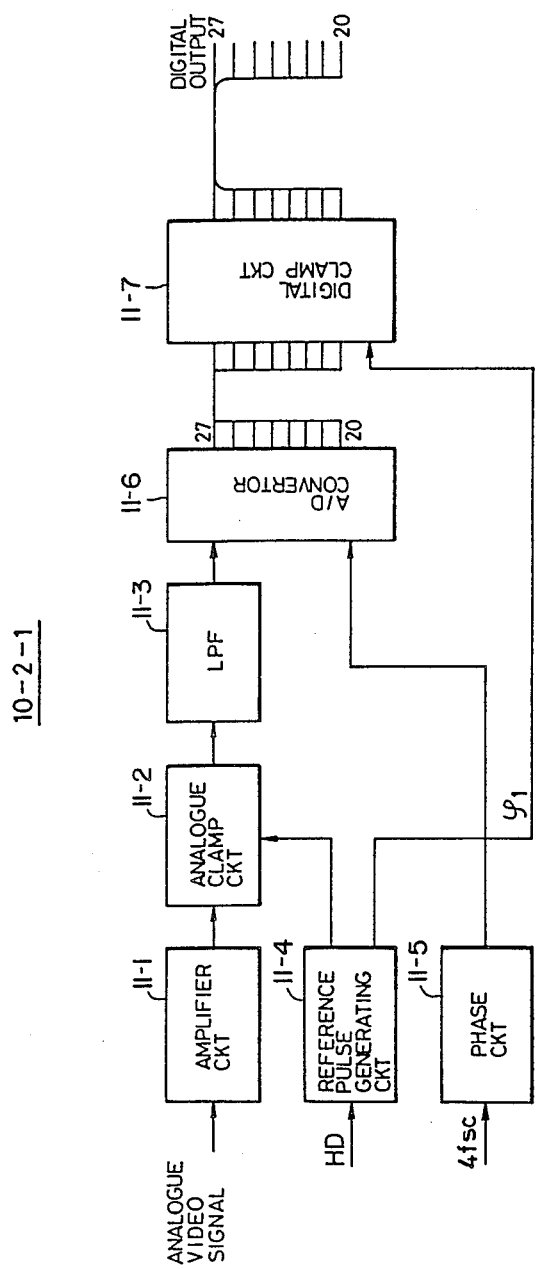
FIG. 11 is a block diagram illustrating an A/D converter.

FIG. 11 illustrates the structure of the A/D converter 10-2-1. An amplifier circuit 11-1 so controls the gain that an input signal to an A/D converter 11-6 will assume a normal level. Then, an analog clamp circuit 11-2 sets, for example, the backporch level of a video signal to a reference voltage relying upon a clamp pulse generated by a reference pulse generating circuit 11-4 responsive to a horizontal synchronizing signal HD. Then the low-pass filter 11-3 limits the frequency band to be lower than $2f_{sc}$ (7.2 MHz). On the other hand, the sampling clocks of $4f_{sc}$ are phase-adjusted by a phase circuit 11-5 utilizing a delay circuit so that the sampling point of A/D conversion will be in agreement with the I- and Q-axes, and are used as sampling clocks of the A/D converter 11-6.

The A/D converter 11-6 converts the signal into a digital signal which is a PCM signal consisting of 8 bits, and then a digital clamp circuit 11-7 sets the digital signal of backporch portion of video signal to predetermined value, for example, to 01000000 (64 levels).

Figure 12:
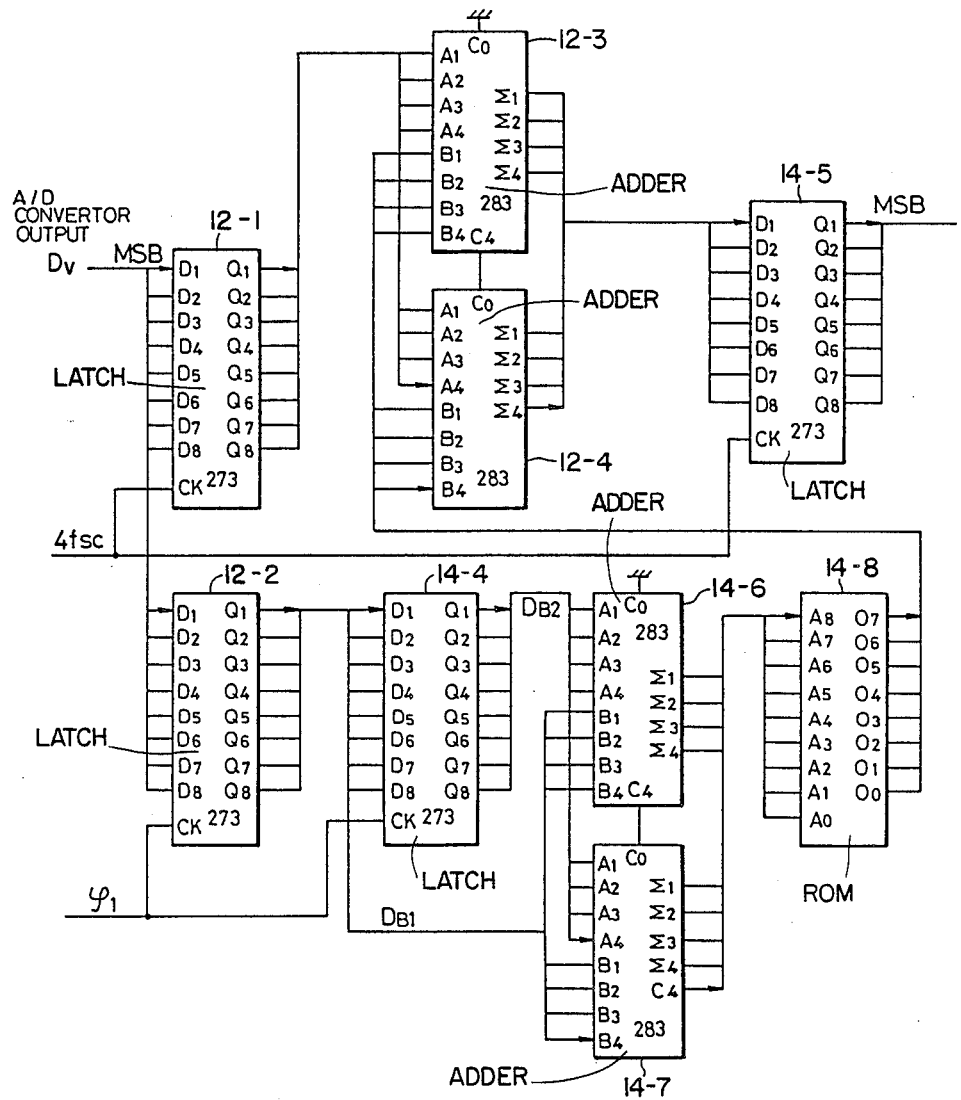
FIG. 12 is a circuit illustrating a digital clamp circuit.

FIG. 12 illustrates an example of the digital clamp circuit 11-7. The output signal of the A/D converter 11-6, on one hand, is latched with the clock of $4f_{sc}$ by a D-type flip-flop 12-1 (corresponds to TTL 74273), and is latched, on the other hand, the data of the backporch portion of video signal generated by the reference pulse generating circuit 44 with a clock $\Psi_1$. If the data of backporch portions of a plurality of scanning lines, for example, of two scanning lines latched with a clock $\Psi_1$ are denoted by $D_{B1}$ and $D_{B2}$, respectively, the adder circuit which consists of a four-bit adders 12-6 and 12-7 (corresponds to TTL 74283) performs the operation $D_{B1}+D_{B2}$ in order to avoid the effect of noise. The ROM 14-8 produces an output $64-(D_{B1}+D_{B2})/2$ for the input of $D_{B1}+D_{B2}$. The effect of noise can be removed by the above-mentioned operation. The addition is performed by an adder circuit which consists of four-bit adders 12-3 and 12-4 and the result is produced as an output signal of the digital clamp circuit. Therefore, if the output signal of the A/D converter 11-6 is denoted by $D_V$, the output signal of the digital clamp circuit 11-7 is given by $D_V+64-(D_{B1}+D_{B2})/2$. Here, if $D_V$ of the backporch portion is $D_{B1}$ and if $D_{B1}=D_{B2}$, then the output signal of the digital clamp circuit of the backporch portion can be set to a constant value, i.e., set to 64 at all times.

Figure 1:
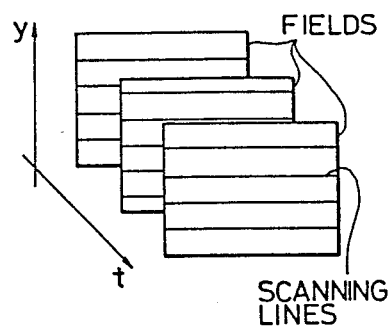
FIGS. 1-7, 8a, 8b and 9 correspond to the figures of U.S. Pat. No. 4,660,072 incorporated by reference herein.
Figure 2:
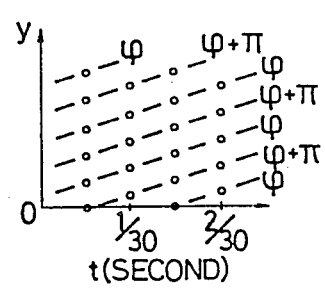
Figure 3:
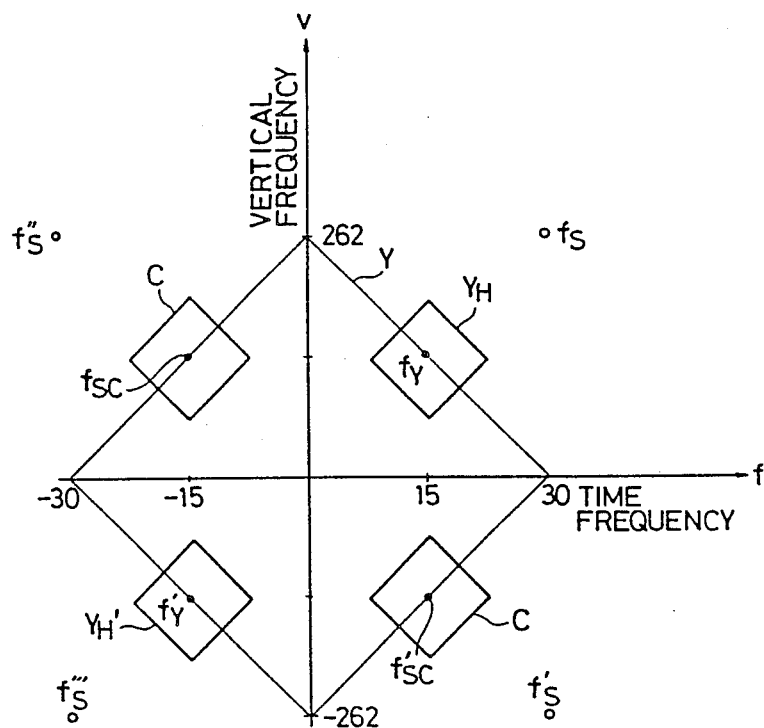
Figure 4:
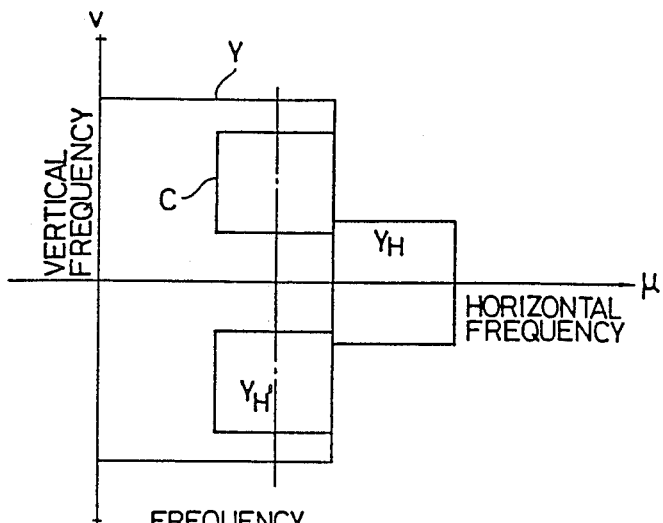
Figure 5:
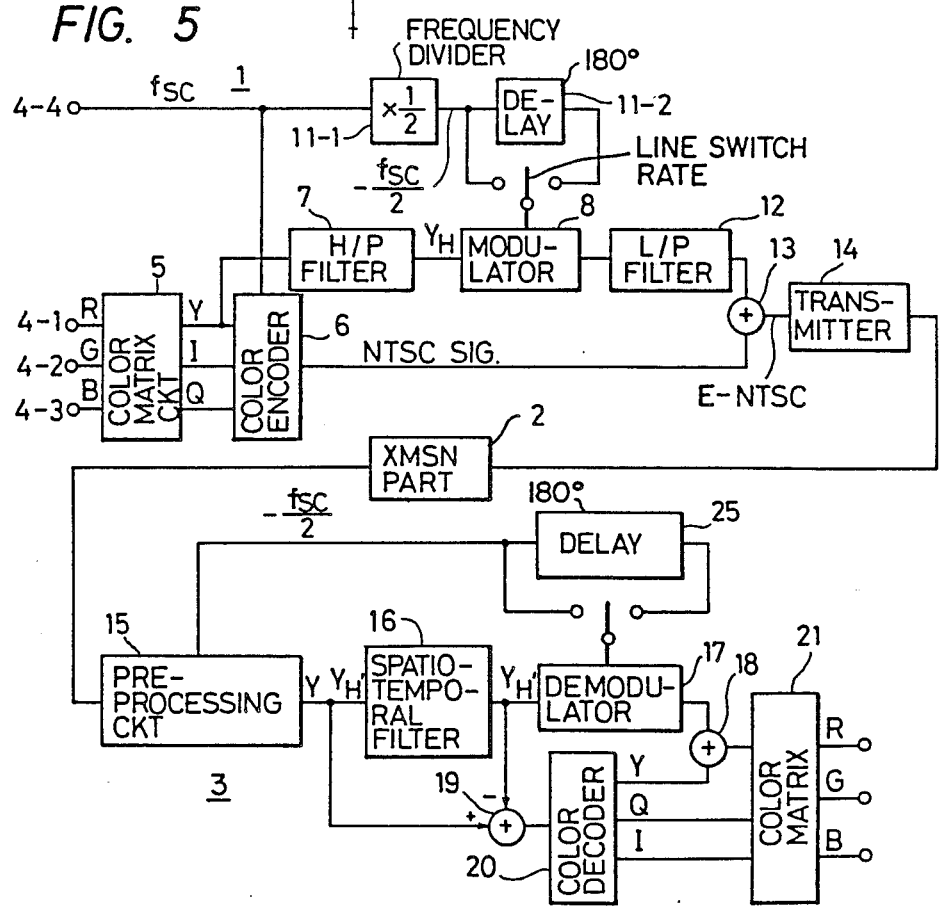
Figure 6:
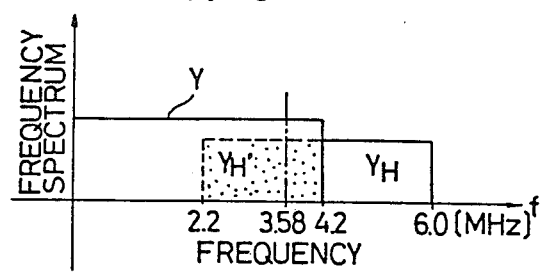
Figure 7:
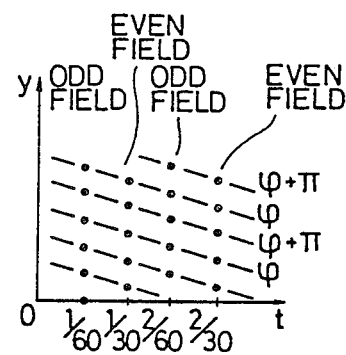
Figure 8A:
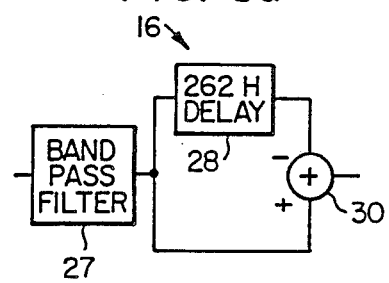
Figure 8B:
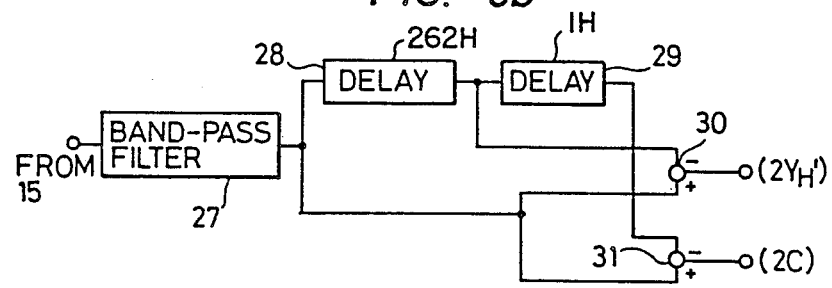
Figure 9:
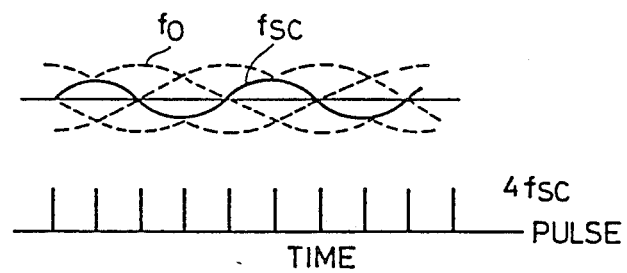
Figure 13:
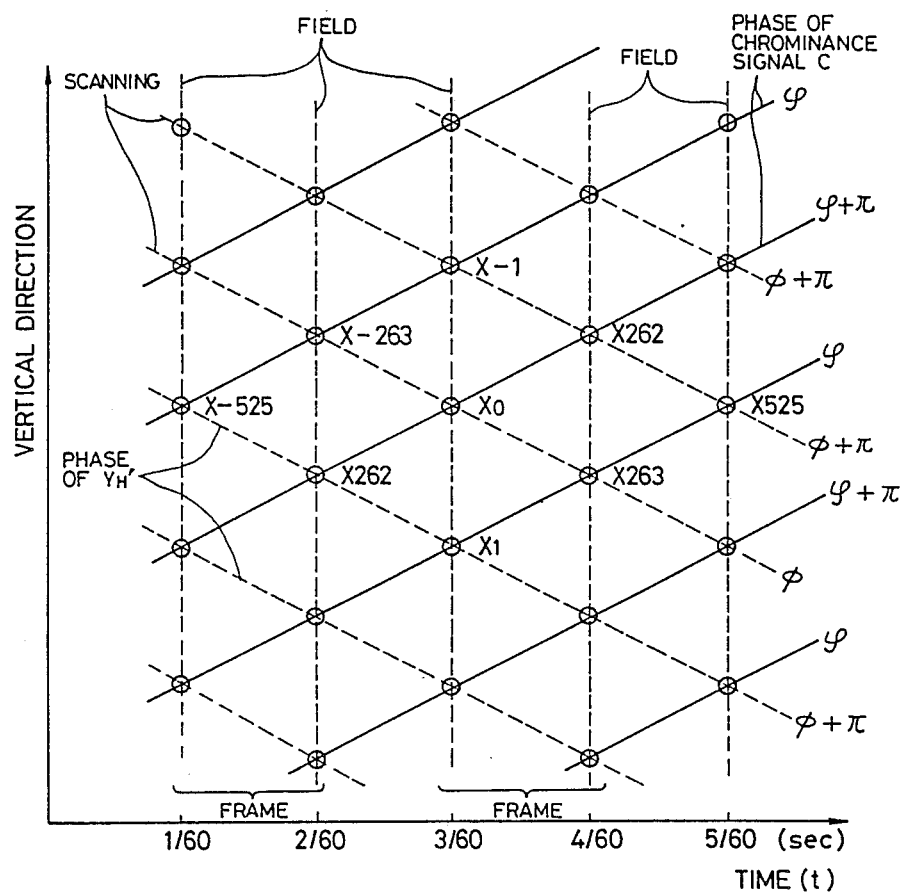
FIG. 13 is a diagram showing a phase relationship between a modulated chrominance signal and modulated luminance signal.

Embodiments of the $Y_L$, C, $Y_H'$ separation circuit 10-2-5 and of the motion detecting circuit 10-2-4 will now be described refering to FIG. 14. For easy comprehension, first, described below with reference to FIG. 13 is the time of a high-resolution television system compatible with the existing television system and a relationship of phase between the modulated chrominance signal C and the high-resolution signal $Y_H'$ in the vertical region. FIG. 13 is a diagram in which FIGS. 2 and 7 are superposed one upon the other, and wherein circles correspond to the scanning lines. Both the existing television system and the high-resolution television system compatible therewith perform the interlaced scanning for the transmission of signals, and the scanning lines are alternatingly interposed for each field. In the existing television system, the phase of the modulated chrominance signal C is inverted for each scanning line and for each frame, and the points of the same phase establish a relation (solid lines connecting the circles) to ascend for each field as shown in FIG. 13.

Even in the high-resolution television system having compatibility, the relation of modulated chrominance signals C is quite the same as that of the existing television system. Furthermore, the phase of the high-resolution signal $Y_H'$ is inverted for each frame and for each scanning line, and the points of the same phase are multiplexed maintaining a relation to descend for each field. Therefore, if the signal of the scanning line at $X_O$ is denoted by $Y_L+C+Y_H'$, there is obtained a signal $Y_L-C-Y_H'$ at a point $X_{-1}$ of one scanning line before, at a point $X_1$ of one scanning line after, at a point $X_{-525}$ of one frame before, and at a point $X_{525}$ of one frame after. Further, a signal $Y_L+C-Y_H'$ is obtained at a point $X_{-262}$ of 262 scanning lines before and at a point $X_{262}$ of 262 scanning lines after, and a signal $Y_L-C+Y_H'$ is obtained at a point $X_{-263}$ of 263 scanning lines before and at a point $X_{262}$ of 263 scanning lines after. A signal $Y_L+C+Y_H'$ is obtained at a point $X_{-1050}$ of two frames before. Therefore, the components $Y_L$, C and $Y_H'$ can be separated by the operation of a signal of the scanning line $X_O$ and a signal of the scanning line of before or after the above-mentioned scanning line.

In this embodiment, the process for separating the components is carried out depending upon the motion of picture as will be mentioned below. In a still picture (hereinafter referred to as M0 mode), first, the components are separated using the signals of $X_O$, $X_{525}$ and $X_{-525}$. That is, the signals C and $Y_H'$ are separated by the operation $$\frac{1}{2}X_O - \frac{1}{4}(X_{-525} + X_{525}),$$

and are subtracted from $X_O$, thereby to pick up the signal $Y_L$. Furthermore, in order to separate the signals C and $Y_H'$ from the signals C and $Y_H'$, the operations $\frac{1}{2}C$, $Y_H'+\frac{1}{2}C$ and $Y_H'-262$ are carried out between the signal C delayed by 262 scanning lines (indicated by 262H) and the signal $Y_H'$ (i.e., between C and $Y_H'-262$), in order to obtain a C-signal component $C_{FM}$. Then, the signal $Y_H'$ is separated from the signals C and $Y_H'-C_{FM}$.

In a quasi-still picture (hereinafter referred to as M1 mode), the signals are separated using signals of $X_O$, $X_{263}$ and $X_{-263}$. That is, the signal component C' is picked up through the operation $\frac{1}{2}X_O-\frac{1}{4}(X_{263}+X_{-263})$. In this mode, the $Y_H'$ signals are not multiplexed on the transmitting side, and the signal $Y_L$ is separated by subtracting the signal component C' that is picked up from $X_O$. Using the signal component C' and the signal $C'_{-262}$ delayed by 262H, the operation $\frac{1}{2}C'+\frac{1}{2}C'_{262}$ is carried out to obtain a signal $C_{FD}$.

In a moving picture (hereinafter referred to as M2 mode), the signals $Y_H'$ are not multiplexed. Therefore, a signal $C_{LN}$ is separated by the operation $\frac{1}{2}X_O+\frac{1}{4}(X_1+X_{-1})$ performed by using signals $X_0$, $X_1$ and $X_{-1}$. By subtracting the signal $C_{LN}$ from the signal $X_0$, it is allowed to separate the signal $Y_L$.

Figure 14:
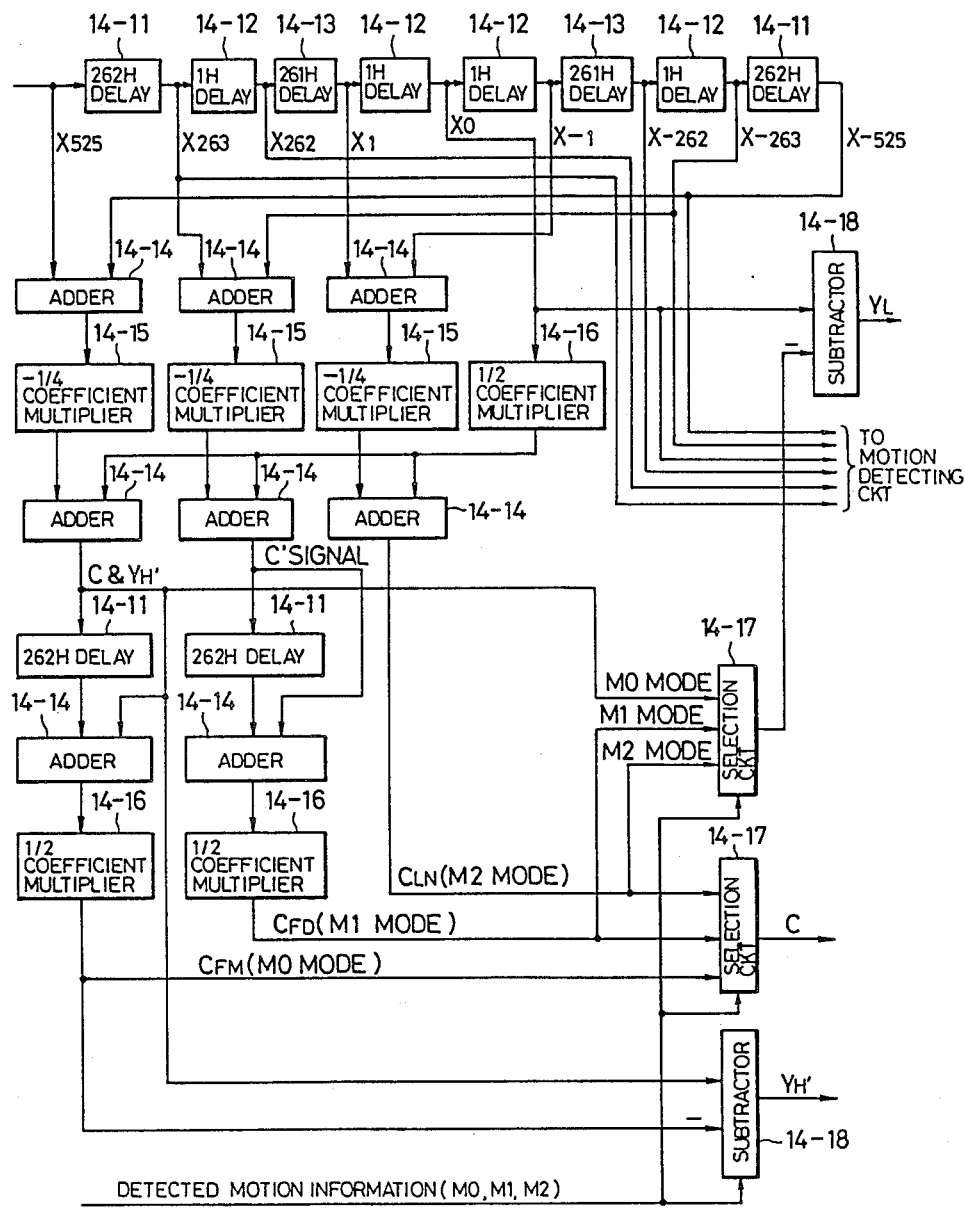
FIGS. 14 and 16 are block diagrams illustrating signal 9L, C and YH' separating circuit.

FIG. 14 shows the structure of the $Y_L$, C, $Y_H'$ separating circuit. A 262H delay circuit 14-11, a 1H delay circuit 14-12 and a 261H delay circuit 14-13 are connected in series to obtain signals $X_0$, $X_1$, $X_{263}$, $X_{325}$, $X_{-1}$, $X_{-263}$ and $X_{-525}$ that are necessary for the separation or for detecting the motion information that will be described later.

Further, the modes are operated by an adder 14—14, a $-\frac{1}{4}$ coefficient multiplier 14-15 and a $\frac{1}{2}$ coefficient multiplier 14-16, in order to obtain the aforementioned signals C, $Y_H'$, $C_{FM}$, $C_{FD}$, and $C_{LN}$. A subtractor 14-18-1 subtracts the signal $C_{FM}$ from the signals C and $Y_H'$, in order to separate the signal $Y_H'$.

Finally, a selecting circuit 14-17-1 selects the signals $C_{FM}$, Chd FD and $C_{LN}$ of corresponding modes according to detected motion information M1 and M2, in order to separate them as signals C. Furthermore, among the signals C, $Y_H'$, $C_{FD}$ and $C_{LN}$, a signal of the corresponding mode is subtracted from $X_0$ in order to separate the signal $Y_L$ by subtractor 14-18-2.

On the other hand, the signals $X_0$, $X_{263}$, $X_{262}$, $X_{-262}$, $X_{-263}$ and $X_{-525}$ are used in a motion detecting circuit that will be described later to produce detected motion information.

This structure is common to both the existing television system and the high-resolution television system having compatibility therewith. In the case of the existing television system, however, it is allowable to use the signals C and $Y_H'$ instead of the signal $C_{FM}$ and to use the signal C' instead of the signal $C_{FD}$. This can be realized by switching the signals utilizing existing/high-resolution discriminating information that will be mentioned in conjunction with the motion detecting circuit.

Figure 15:
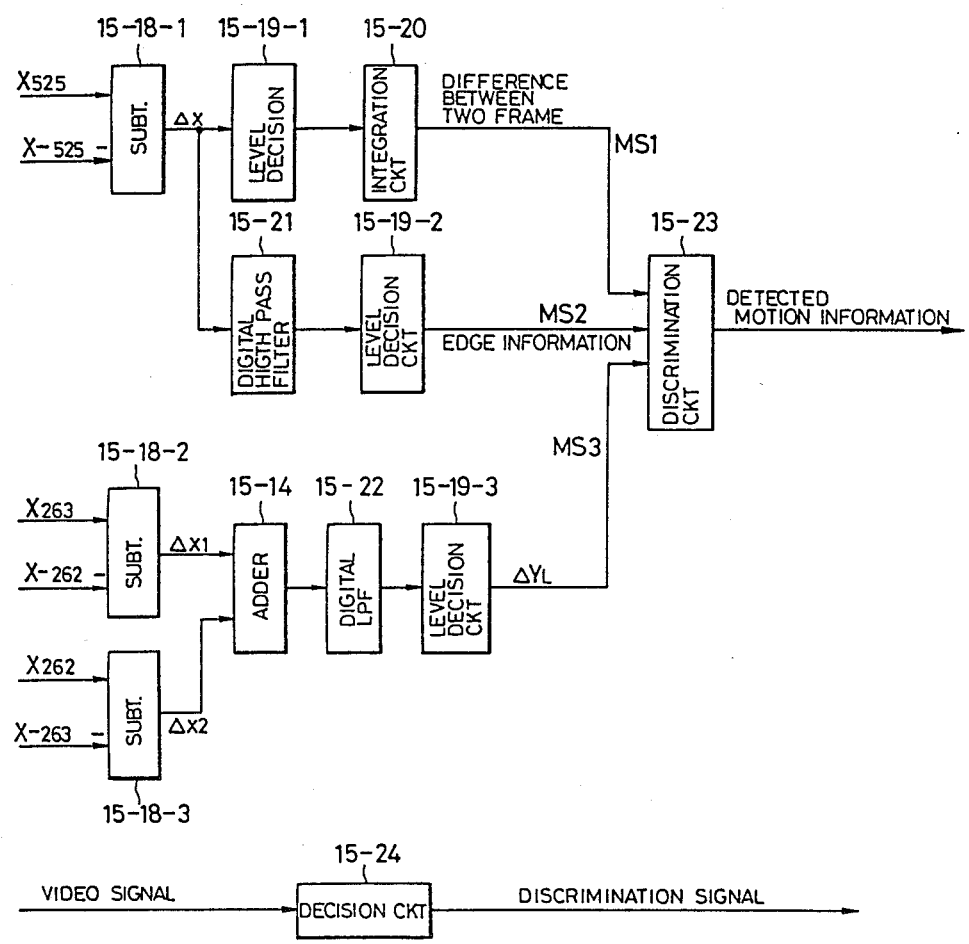
FIGS. 15 and 17 are block diagrams illustrating a motion detecting circuit.

FIG. 15 shows the motion detecting circuit 10-2-4 in which a subtractor 15-18-1 finds a difference between the signals $X_{525}$ and $X_{-525}$ that are separated apart by two frames. As shown in FIG. 13, the signals C and $Y_H'$ are in pause with each other at $X_{525}$ and $X_{-525}$. In the still picture, therefore, the output becomes zero. Concerning the output signal $\Delta x$ of subtractor 15-18-1, therefore, a level decision circuit 15-19-1 compares $|\Delta x|$ with a threshold value $\Delta th_1$. A signal "O" is produced when $|\Delta x| \leq \Delta th_1$ and a signal "1" is produced when $|\Delta x| > \Delta th_1$. When zero continues over a plurality of picture elements, an integrating circuit 15-20 produces a signal MS1 which is "0", and produces a signal MS1 which is "1" in other cases.

A digital high-pass filter 15-21 has a transfer function given by $$\sin^2 \pi \frac{f}{2fsc}$$

to pick up higher frequency components of the signal $\Delta x$. A level decision circuit 15-19-2 compares the high frequency components with a threshold value $\Delta th_2$, and produces a signal MS2 which is "0" when an absolute value thereof is smaller than $\Delta th_2$ and produces the signal MS2 which is "1" when the absolute value thereof is greater than $\Delta th_2$. The signal MS2 corresponds to edge information of the moving picture.

Using a signal of difference between the two frames, however, motion may not often be detected when, for example, a fine line moves on the picture. Therefore, differences $\Delta x_1$ and $\Delta x_2$ are further obtained through subtractors 15-18-2 and 15-18-3 for the scanning lines $X_{263}$, $X_{-262}$, $X_{262}$ and $X_{-263}$ that are separated by one frame. Even in the still picture, the difference signal $\Delta x_1$ contains a chrominance signal C and the difference signal $\Delta x_2$ contains a chrominance signal $-C$. Therefore, the two signals are added up together through an adder 15-14, and low-pass components are extracted through a digital low-pass filter (LPF) 15-22 which has a transfer function given by $$\cos^2 \pi \frac{f}{2fsc}.$$

Therefore, the output signal $\Delta Y_L$ of the digital low-pass filter 15-22 gives moving information of the signal $Y_L$. A level decision circuit 15-19-3 compares the signal $\Delta Y_L$ with a threshold value $\Delta th_3$, and produces an output MS3 which is "0" when the absolute value thereof is smaller than $\Delta th_3$ and produces the output MS3 which is "1" when the absolute value is greater than $\Delta th_3$.

A discrimination circuit 15-23 discriminates the modes M0, M1 and M2 of the detected motion information as tabulated below depending upon the three kinds of signals MS1, MS2 and MS3.

| MS1 | MS2 | MS3 | Mode information |
| --- | --- | --- | --- |
| 0 | 0 | 0 | M0 |
| 0 | 0 | 1 | M2 |
| 1 | 0 | 0 | M1 |
| 1 | 0 | 1 | M2 |
| 1 | 1 | — | M2 |

Here, threshold values of the level decision circuits may be changed depending upon the level of $X_0$ in order to improve the detecting precision.

Figure 16:
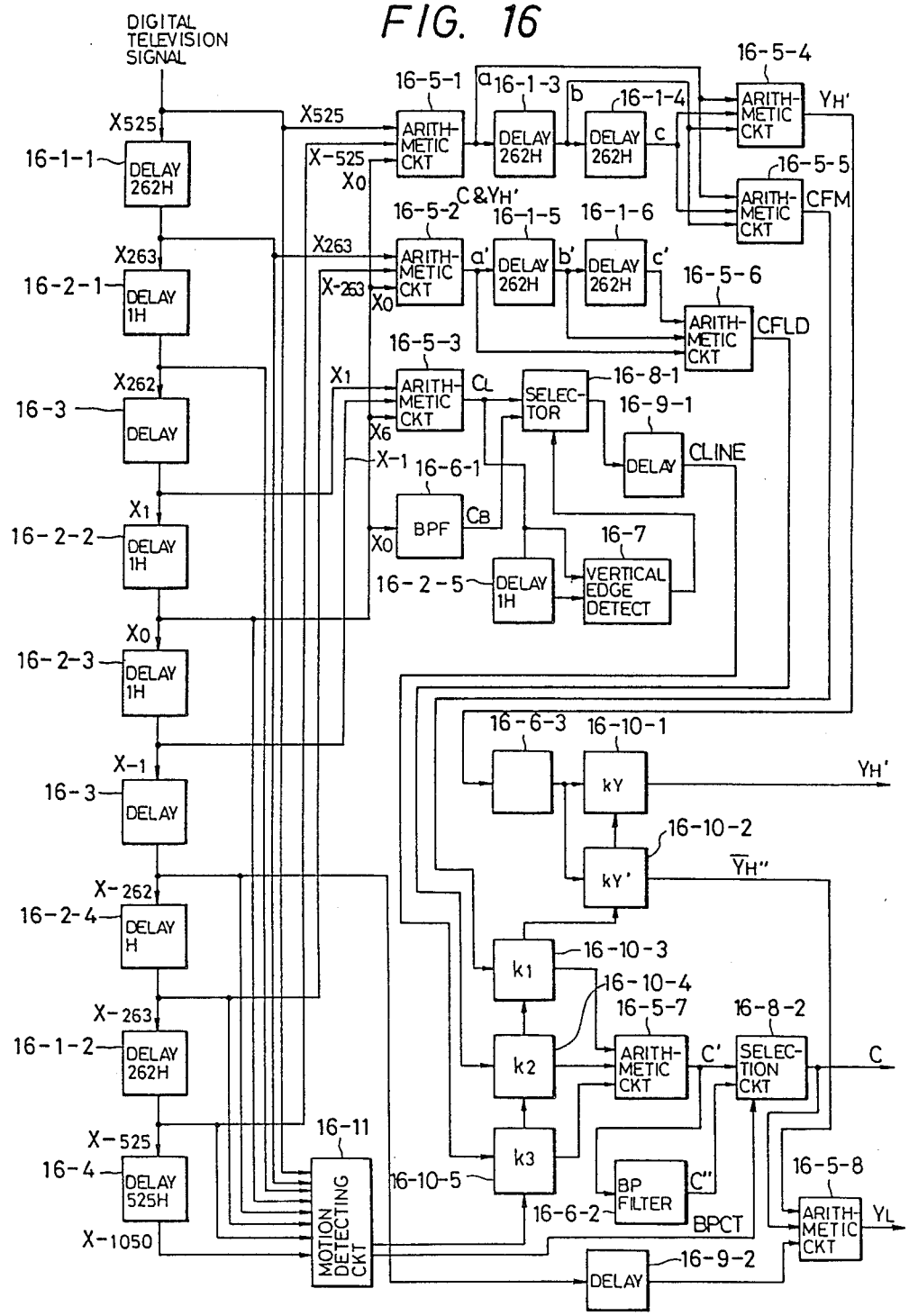

FIG. 16 illustrates chrominance signal and luminance signal separating circuits and a motion detecting circuit according to another embodiment.

First, signals of the scanning lines $X_O$, $X_{525}$ and $X_{-525}$ are subjected to the operation of $\frac{1}{2}X_0 - \frac{1}{4}(X_{525} + X_{-525})$ through an arithmetic circuit 16-5-1, to pick up C and $Y_H'$ signal components as a signal $\eta$ based upon a so-called interframe separation. An arithmetic circuit 16-5-4 performs the operation $\frac{1}{2}i - \frac{1}{4}(\eta + j)$ to produce a signal $Y_H'$ in response the above signal and the signals i and j delayed by 262-line delay circuits 16-1-3 and 16-1-4. Another arithmetic circuit 16-5-5 performs the operation $\frac{1}{2}i + \frac{1}{4}(\eta + j)$ to produce the signal $C_{FM}$.

Next, an arithmetic circuit 16-5-2 carries out the operation $\frac{1}{2}X_0 - \frac{1}{4}(X_{263} + X_{-263})$ in response to the signals of the scanning lines $X_0$, $X_{263}$ and $X_{-263}$ to pick up a signal $\eta'$ relying upon a so-called interfield separation. An arithmetic circuit 16-5-6 carries out the operation $\frac{1}{2}i' + \frac{1}{4}(\eta' + j')$ in response to the above signal and the signals i' and j' delayed by 262-line delay circuits 16-1-5 and 16-1-6, in order to produce a signal $C_{FLD}$.

In response to the signals of the scanning lines $X_0$, $X_1$ and $X_{-1}$, furthermore, an arithmetic circuit 16-5-3 performs the operating $\frac{1}{2}X_0 - \frac{1}{4}(X_1 + X_{-1})$ to pick up a signal $C_L$ relying upon a so-called interline separation.

In response to the signal of the scanning line $X_0$, a band pass filter 16-6-1 picks up a component having a horizontal frequency of, for example, $f_{sc} \pm 0.5$ MHz as a signal CB.

A selection circuit 16-8-1 usually produces the signal $C_L$. When a component having a high vertical frequency is detected by a vertical edge detecting circuit 16-7, however, the selection circuit 16-8-1 selects the signal $C_B$ to separate a signal having small cross luminance. The vertical edge detecting circuit 16-7 adds the signal $C_L$ to a signal obtained by delaying the signal $C_L$ by one line delay 16-2-5, and detects the case where the absolute value of the calculated result has exceeded the threshold value $\Delta H$, as a component having a high vertical frequency, i.e., as a vertical edge. As for the picture element detected as the vertical edge, in this case, it is desired to treat the neighboring picture elements (e.g., preceding and succeeding picture elements) as picture elements that include vertical edges, or to suitably give weight to the signals $C_L$ and $C_B$ to continuously shift the signal $C_L$ to the signal $C_B$, so that the degradation is reduced during the switching operation.

The output signal of the selection circuit 16-8-1 is delayed by a delay circuit 16-9-1 to meet the signals $C_{FM}$ and $C_{FLD}$, and whereby a signal $C_{LINE}$ is generated.

The signals $C_{FM}$, $C_{FLD}$ and $C_{LINE}$ are weighted with motion coefficients $k_1$, $k_2$ and $k_3$ through multiplier circuits 16-10-3, 16-10-4 and 16-10-5. These results are added up together through an arithmetic circuit 16-5-7 to generate signals C' (i.e., $k_1 C_{FM} + k_2 C_{FLD} + k_3 C_{LINE}$). Among these signals and the signals C" that have passed through the BPF 16-6-2, the selection circuit 16-8-2 selects the signals C' for the still picture and selects the signals C" for the moving picture in response to a signal BPCT. The output of the selection circuit 16-8-2 is served as a separated chrominance signal C. The multiplier circuit 16-10-1, 16-10-5 can be easily realized by, for example, a table-look-up method using a ROM (read-only memory).

The separated signals $\overline{Y_H'}$ are supplied to a band pass filter 16-6-3 to pick up components of 2 to 4.2 MHz in the horizontal direction, weighted with motion coefficients $k_Y$, $k_Y'$ through multiplier circuits 16-10-1 and 16-10-2, and one of them is used as a high-resolution signal $Y_H'$.

Further, the signal of the scanning line $X_{-262}$ is delayed through a delay circuit 16-9-2 to meet the signals C and $\tilde{Y}_H''$. From this signal are subtracted the signals C, $\tilde{Y}_H''$ by an arithmetic circuit 16-5-8, in order to produce a separated lower frequency component $Y_L$ of luminance signal.

Here, the motion coefficients $k_1$ to $k_3$, $k_{Y'}$ and $k_{Y''}$, and a signal BPCT are produced by a motion detecting circuit 16-11 that will be described below.

Figure 17:
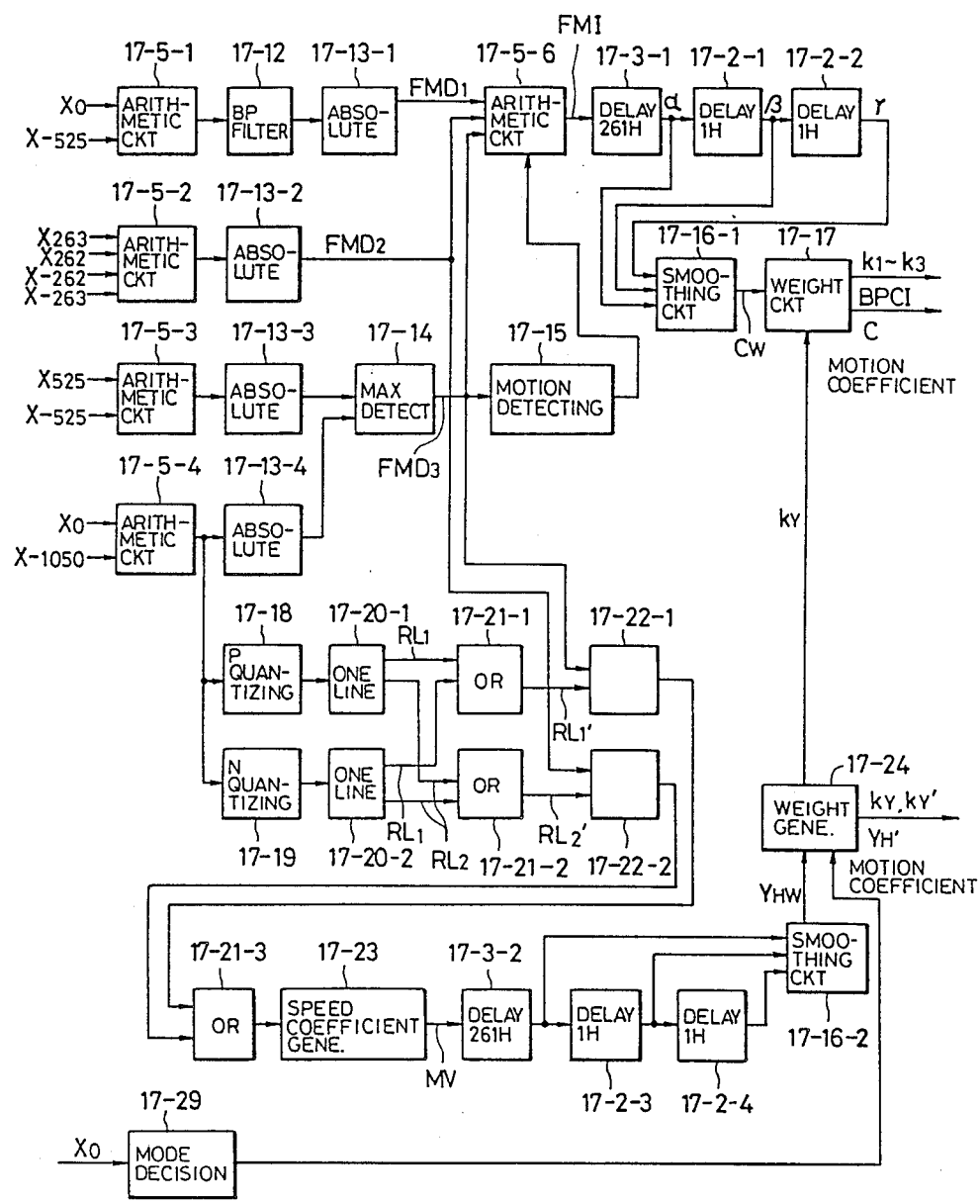

FIG. 17 shows an embodiment of the motion detecting circuit 16-11 of FIG. 16.

First, described below is how to detect the motion information. Here, the motion information in the frequency region includes the following three kinds.

Figure 18A:
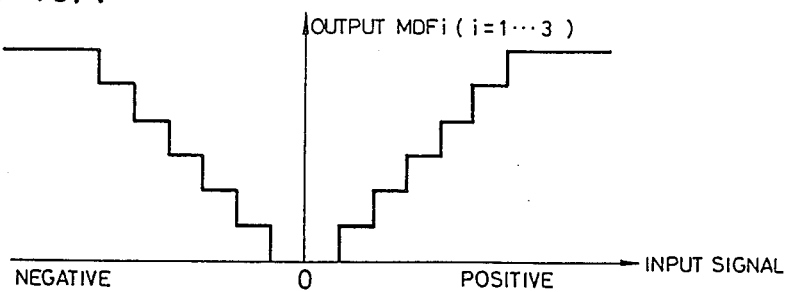
FIGS. 18A, 18B, 18C and 18D show characteristics of the motion detecting circuit for explaining the operation thereof.

An arithmetic circuit 17-5-1 performs the operation $X_0 - X_{-525}$ for the signals of the scanning lines $X_0$ and $X_{525}$, and an low pass filter 17-12 picks up signals over a band of 0 to 2 MHz. These signals are converted into absolute values and are quantized through an absolute value circuit 17-13-1, thereby to form motion information FMD1. Characteristics of the absolute value circuit 17-13-1 are shown in FIG. 18A. This circuit 17-13-1 can be easily constituted using ROM or the like. Namely, an input signal is corresponded to an address of a ROM, and an output signal is produced as a signal consisting, for example, of four bits in response to the input signal relying upon the table look-up.

Figure 18B:
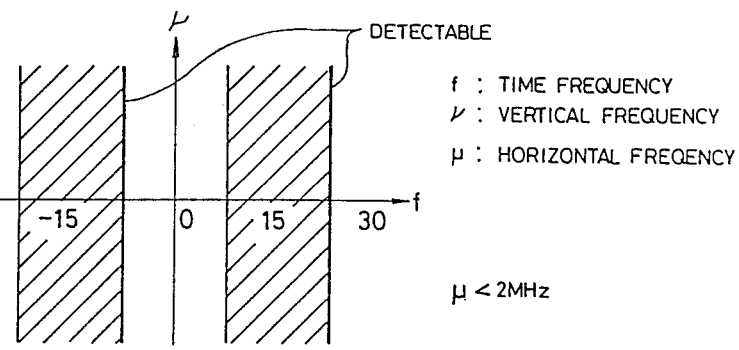

In a three-dimensional frequency region consisting of horizontal frequency $\mu$, vertical frequency $v$ and time frequency $f$, the hatched regions of FIG. 18B are detected as motion information FMD1.

Figure 18C:
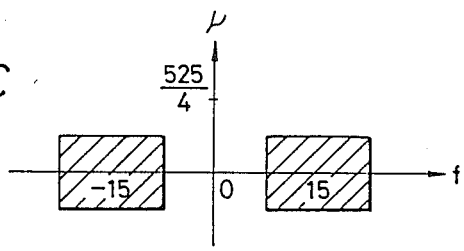

Next, an arithmetic circuit 17-5-2 performs the operation $X_{263} - X_{-262} + X_{262} - X_{-263}$ in response to the signals of the scanning lines $X_{263}$, $X_{262}$ $X_{-262}$ and $X_{-263}$, and an absolute value circuit 17-13-2 produces motion information FMD2. In FIG. 18C, hatched regions are detected as moving portions detected by the arithmetic circuit 17-5-2 and the absolute value circuit 17-13-2.

Figure 18D:
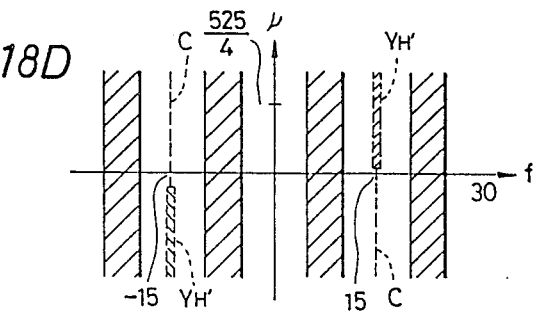

Arithmetic circuits 17-5-3 and 17-5-4 perform the operations $X_{525} - X_{-525}$ and $X_1 - X_{-1050}$ in response to the signals of the scanning lines $X_{525}$, $X_{-525}$, $X_0$ and $X_{-1050}$, and absolute value circuits 17-13-3 and 17-13-4 convert and quantize the signals and, then, a maximum value selection circuit 17-14 selects a signal having a larger absolute value in order to form motion information FMD3. This information is detected with the hatched regions of FIG. 18D as motions. FIG. 18D also depicts spectra of the signal C and the signal $Y_H'$ in the still picture.

Among the above-mentioned three motion informations, FMD1 and FMD2 may generate motion information in some pictures though they may be still pictures. For instance, motion information PMD2 is generated in a picture that includes signals having high vertical frequency components or that includes the signals $Y_H'$, and motion information FDM1 is generated in a picture that includes signals C having a horizontal frequency $\mu$ of about 2 MHz or that includes the signals $Y_H'$. Even in the still picture, therefore, FMD1 and FMD2 may erroneously detect the motion. It is therefore attempted to prevent erroneous detection of this kind by utilizing large area still/motion discrimination that will be mentioned below.

A large area still/motion discrimination circuit 17-15 discriminates whether it is a still picture or a motion picture in response to the signals of FMD3 over a large area consisting of, for example, several tens of picture elements. When the result is discriminated to be the still picture, an arithmetic circuit 17-5-6 ceases to perform the operation for adding FMD1 and FMD2. When the result is discriminated to be the motion picture the arithmetic circuit 7-5-6 performs the operation to add FMD1 and FMD2 to FMD3. As described above, the motion informations FMD1 and DMD2 are used for the motion pictures only, and the above-mentioned erroneous detection is prevented from occurring.

The still picture or the motion picture is discriminated over a large area because of the following reasons. Namely, with the signals of FMD3, the points of a time frequency $f = 15$ Hz become zero points and some motions may not be detected. In order to eliminate this probability, the picture is discriminated over a wide area.

Figure 19A:
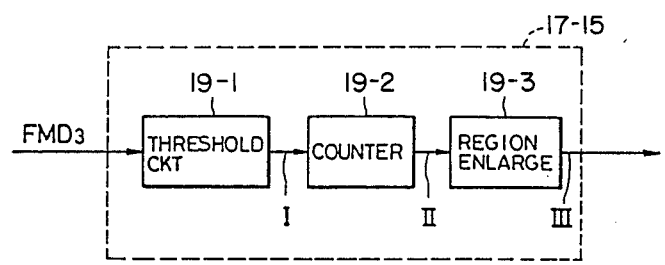
FIG. 19A is a block diagram illustrating a discrimination circuit 17-15.
Figure 19B:
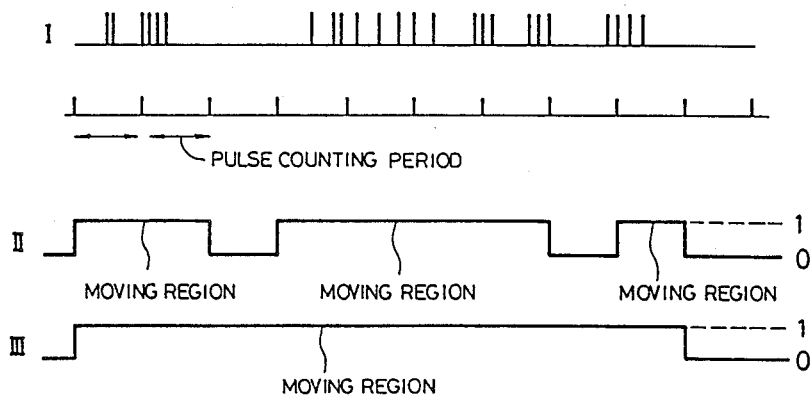
FIG. 19B shows a time chart for explaining an operation of the circuit shown in FIG. 19A.

FIG. 19A illustrates the large area still/motion discrimination circuit 17-15 and FIG. 19B shows the signals I, II, III presented in FIG. 19A. The signal of FMD3 in converted into a binary signal by a threshold circuit 19-1, i.e., converted into a signal "1" when it exceeds a threshold value $\Delta TH$ and into a signal "0" in other cases. For the thus obtained signal I, a counting circuit 19-2 counts the number of "1"s during a counting period of, for example, 48 picture elements. When the number exceeds a particular value (e.g., 3), the counting circuit 19-2 produces a signal "1" denoted by II which represents a motion picture region. When the number is smaller than the particular value, it produces a signal "0" denoted by II which represents a still picture region. A region enlargement circuit 19-3 enlarges the motion picture region by changing a still picture region sandwitched by the motion picture regions into a motion picture region, and produces a still picture or motion picture discrimination signal III based upon large areas.

Figure 20:
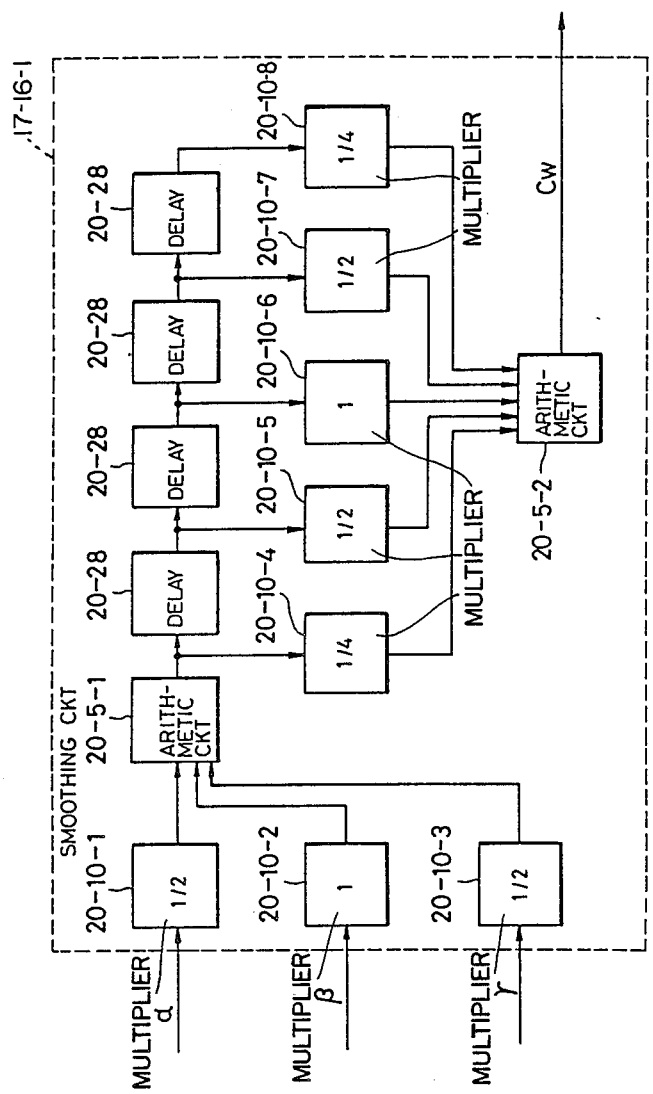
FIG. 20 is a block diagram illustrating the circuit 17-16 shown in FIG. 17.

The signals FMI obtained from the aforementioned three motion informations FMD1 to FMD3 are delayed through a 261-line delay circuit 17-3-1 and a 1-line delay circuit 17-2-1, and 17-2-2, respectively, and are spatially smoothed through a smoothing circuit 17-16 to generate signals $C_W$. FIG. 20 illustrates an embodiment of the smoothing circuit 17-16-1. Output signals $\alpha$, $\beta$ and $\gamma$ of the delay circuits 17-3-1, 17-2-1, 17-2-2 are weighted by $\frac{1}{2}$, 1 and $\frac{1}{2}$ by multiplier circuits 10-10-1, 20-10-2 and 20-10-3, and these signals are added up together through an arithmetic circuit 20-5-1 to perform the smoothing in the vertical direction. The output signal of circuit 20-5-1 is delayed by 1-picture element delay circuits 20-28~20-28-4, and the output signals of delay circuits 20-28-1~20-8-4 are weighted by $\frac{1}{4}$, $\frac{1}{2}$, 1, $\frac{1}{2}$ and $\frac{1}{4}$ by multiplier circuits 20-10-4 to 20-14-8, respectively and are added up together through an arithmetic circuit 20-5-2 to form a signal $C_W$ that is also smoothed in the horizontal direction.

Figure 21A:
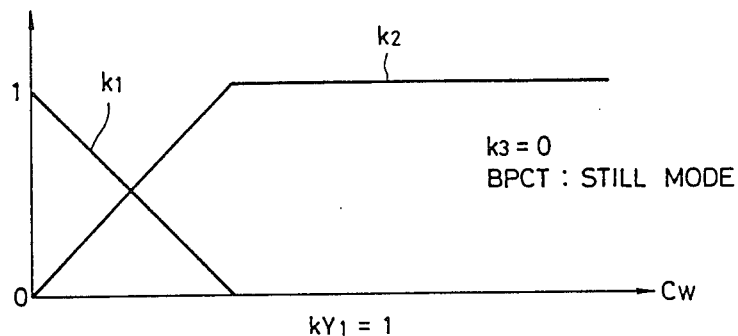
FIGS. 21A and 21B show characteristics of the circuit shown in FIG. 20 for explaining the operation thereof.
Figure 21B:
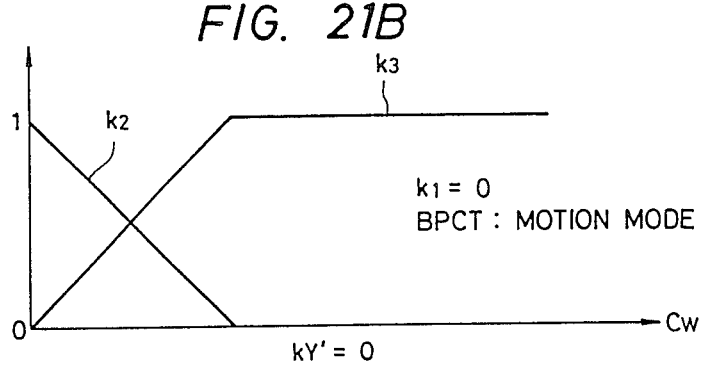
Figure 21C:
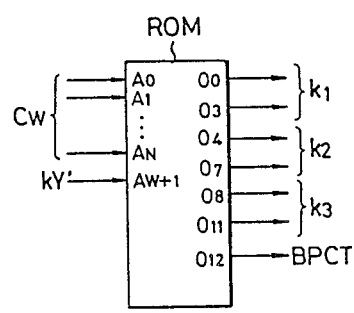
FIG. 21C is a block diagram illustrating the circuit 17—17 shown in FIG. 17.

Based upon a spatially smoothed motion signal $C_W$ and a signal $kY'$ prepared by a $Y_H$ weight circuit 17-24 that will be described later, a C weight circuit 17-17 of FIG. 17 produces motion coefficients $k_1$ to $k_3$ having characteristics as shown in FIGS. 21A and 21B, as well as a signal BPCT. This function can be easily realized using, for example, ROM or the like as shown in FIG. 21C.

In the foregoing was described how to detect motion information for the signals C. Returing to FIG. 17, the detection of motion information for the signals $Y_H'$ will now be described.

Figure 22A:
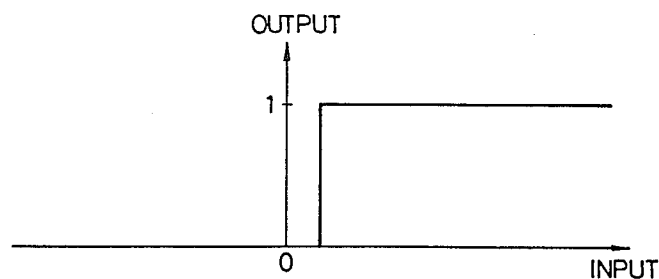
FIGS. 22A and 22B show characteristics of the circuits 17-18 and 17-19 shown in FIG. 17.
Figure 22B:
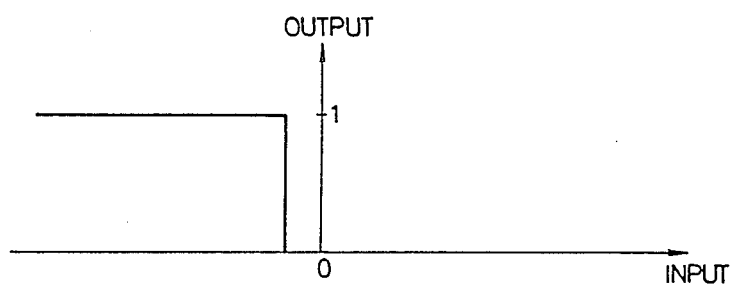

As for the signals $Y_H'$ the motion information is detected by also utilizing speed information. For this purpose, a positive quantizing circuit 17-18 and a negative quantizing circuit 17-19 convert the signal $X_0 - X_{-1050}$ obtained from the arithmetic circuit 17-5-4 into a binary signal of "0" or "1" maintaining characteristics as shown in FIGS. 22A and 22B. Owing to this operation, the region of a binary signal "1" corresponds to a period of between $X_0$ and $X_{-1050}$, i.e., corresponds to a region that has moved between the two frames. Therefore, the speed can be detected depending upon the length of this region. Therefore, 1-line measuring circuits 17-20-1 and 17-20-2 produce a signal RL1 of the level "1" when "1s" are measured in a number of four or more consecutively and produce a signal RL1 of the level "0" when the number of "1s" is small than four, and further produces a signal RL2 of "1" when "1s" are measured in a number of six or more consecutively and produces a signal RL2 of "0" when the number of "1s" is smaller than six. Accordingly, the signal RL1 corresponds to detecting the motion of a speed which is greater than four picture elements between the two frames, and the signal RL2 corresponds to detecting the motion of a speed which is greater than six picture elements.

Figure 23:
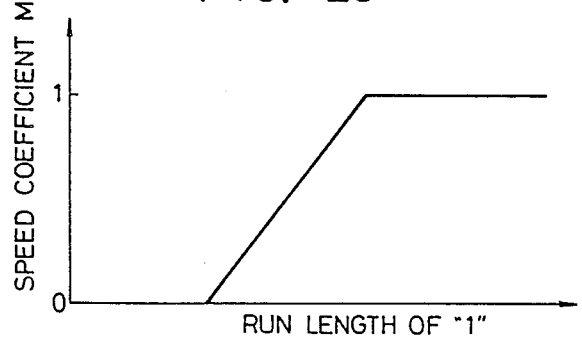
FIG. 23 shows characteristics of the circuit 17-21-3 shown in FIG. 17.

The signals RL1 and RL2 are subjected to the OR operation through OR circuits 17-21-1 and 17-21-2. Binary circuits 17-22-1 and 17-22-2 convert the signals of FMD3 and FMD2 into signals "1" when they exceed a particular value $\Delta T'$ and into signals "0" when they are smaller than $\Delta T'$. However, the binary circuits produce outputs "0" when the signals RL1' and RL2' are "0", i.e., produce outputs "0" for the still picture and for very slow speeds. The output signals of the circuits 17-22-1 and 17-22-2 are subjected to the OR operation through an OR circuit 17-21-3, and a speed coefficient generating circuit 17-23 generates a speed coefficient MV of one line. FIG. 23 shows characteristics thereof.

The speed coefficient MV is delayed by 261-line delay circuit 17-3-2 and 1-line delay circuits 17-2-3 and 17-2-4, and is smoothed in the horizontal direction and in the vertical direction through a smoothing circuit 17-16-2 (constructed in the same manner as in FIG. 20) in order to form a signal $Y_{HW}$.

Figure 24:
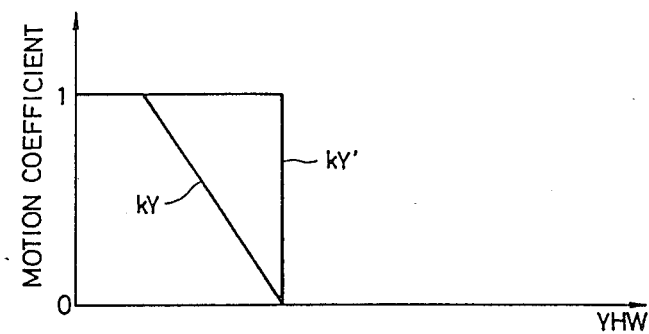
FIG. 24 is showing of characteristics of the circuit 17-24 shown in FIG. 17.
Figure 25:
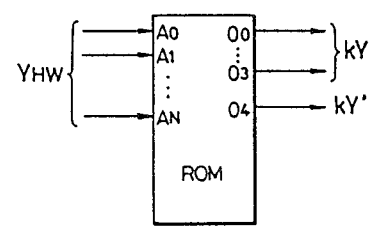
FIG. 25 is a block diagram illustrating one embodiment of circuit 17-24 shown in FIG. 17.

In response to the signal $Y_{HW}$, a $Y_H$ weight circuit 17-24 produces motion coefficients kY and kY' for a high-resolution signal $Y_H'$. FIG. 24 shows characteristics of the motion coefficients kY and kY' that can be easily obtained using ROM or the like as shown in FIG. 25.

A mode decision circuit 17-29 decides whether signal to be processed is an existing television signal or a high-resolution television signal having compatibility therewith depending upon, for example, phase data of a subcarrier $\mu_o$ that corresponds to a high-resolution signal, and renders the coefficient kY of th $Y_H$ weight circuit 17-24 to be zero at all times in the case of the existing television signal.

Owing to the above-mentioned function, the signals $Y_L$, C and $Y_H'$ adapted to the motion can be separated for both the existing television signals and the high-resolution television signals having compatibility therewith.

In the high-resolution television system having compatibility, the motion information may also be transmitted from the transmitting side. In this case, it needs not be pointed out that the use of the motion information that is transmitted helps improve the precision for detecting the motion.

In the high-resolution television system, furthermore, the phase information for reproducing the signals $Y_H'$ on the receiving side may be particularly transmitted. Depending upon the presence or absence of the aforementioned motion information or phase information, therefore, distinction can be made over the existing television system. That is, the decision circuit 17-24 produces discrimination information of the two systems depending upon the presence or absence of the abovementioned information. The discrimination information is based upon the aforementioned $Y_L$, C, $Y_H'$ separation or the reproduction control of the signals $Y_H'$ that will be described below.

Figure 26:
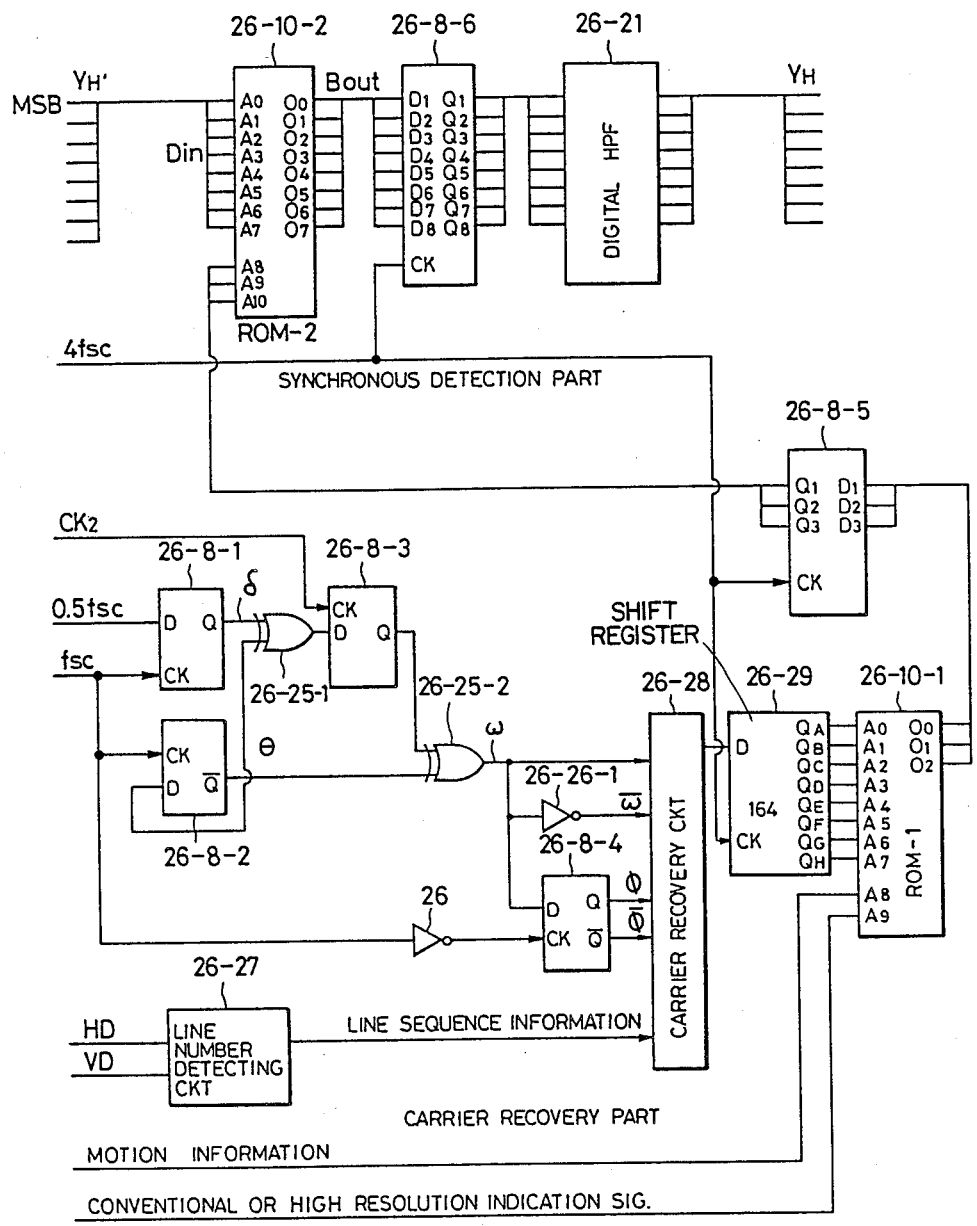
FIG. 26 is a block diagram illustrating one embodiment of the demodulating circuit for signal YH'.

FIG. 26 illustrates the structure of a circuit for demodulating high-resolution signals $Y_H'$. FIG. 26 shows the case where the frequency of carrier waves used for multiplexing the signals $Y_H'$ is 0.5 $f_{sc}$. In FIG. 26, an upper portion denotes a synchronous detection part and a lower portion denotes a carrier recovery part necessary for the synchronous detection. The carrier recovery part will be described, first.

Clocks of 0.05 $f_{sc}$ transmitted as phase information of carrier waves form signals $\delta$ that are shaped with clocks $f_{sc}$ through a D-type flip-flop 26-8-1. The signals $\delta$ are compared in regard to their phases by an exclusive OR (EXOR) circuit 26-25-1 with the signals $\beta$ obtained by dividing the clocks $f_{sc}$ by 2. The result is latched with a clock CK2 for a period of phase information that is transmitted (e.g., latched with a clock having component $f_{sc}$ for a period of phase information). The output signal and the signal $\theta$ are then input to an EXOR circuit 26-25-2. Therefore, the phase of the output signal $\omega$ of the EXOR circuit 26-25-2 is in perfect agreement with that of the clock 0.5 $f_{sc}$ transmitted. In response to the signal $\omega$, there are prepared a signal $\bar{\omega}$ that is inverted through an inverter circuit 26-26-1, a signal $\phi$ latched with $f_{sc}$ that is botained by inverting the signal $\omega$ through an inverter circuit 26-26-2, and a signal $\bar{\phi}$ of which the polarity is inverted. A line number detecting circuit 26-27 detects a scanning line number from a horizontal synchronizing signal HD and a vertical synchronizing signal VD, and inputs it as a line sequence information to a carrier recovering circuit 26-28.

Figure 27:
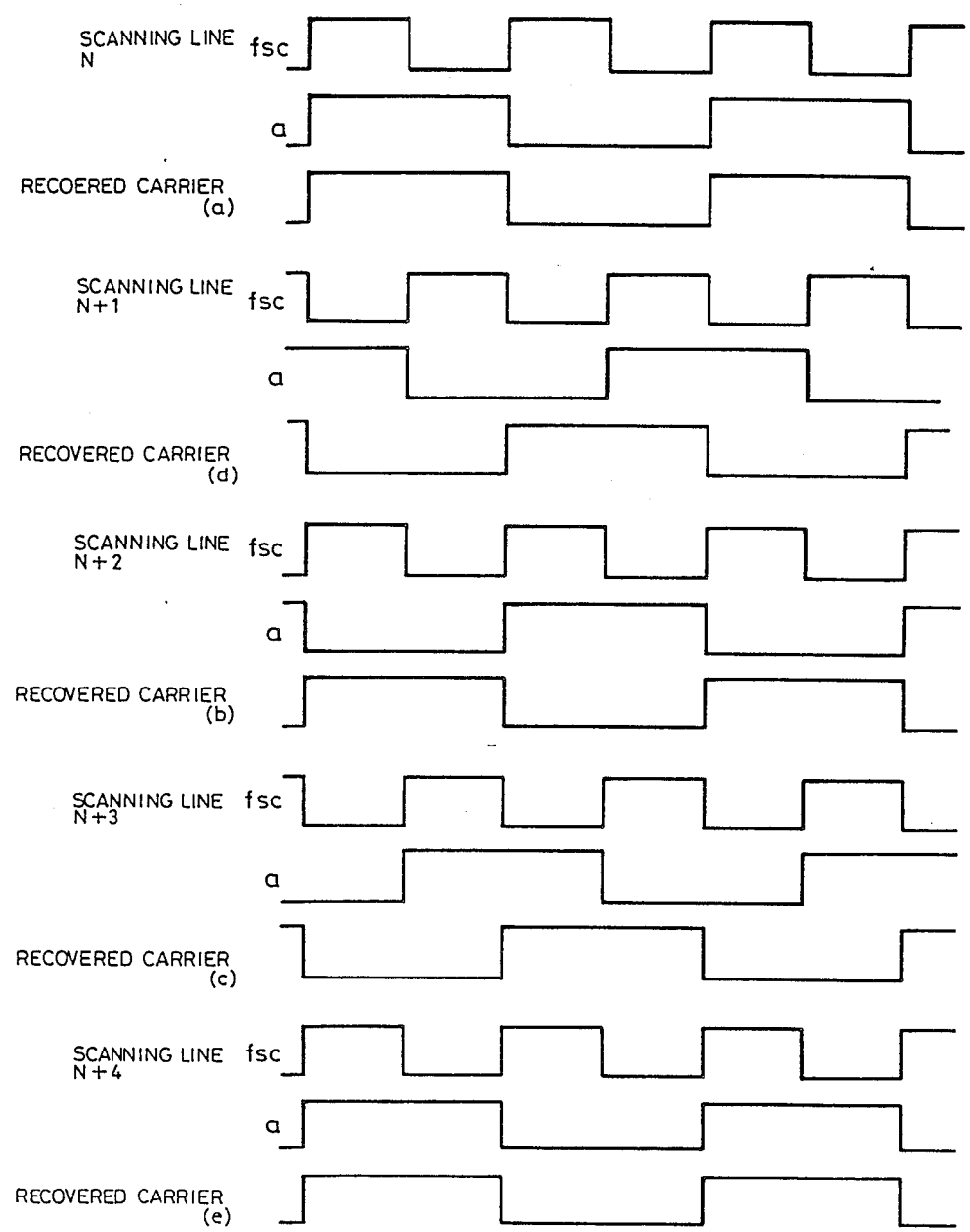
FIG. 27 shows a time chart for explaining an operation for carrier reproducing signal YH'.

Based upon this information, the carrier recovering circuit 26-28 selects the recovered carrier waves necessary for detecting the synchronism from the four kinds of signals $\omega$, $\bar{\omega}$, $\phi$ and $\bar{\phi}$. This state is shown in FIG. 27. The recovered carrier waves are inverted for their phases for each scanning line as shown in FIG. 27. Therefore, the recovered carrier waves are selected at a period of four lines; i.e., the signal $\omega$ is selected at a scanning line number N, the signal $\bar{\phi}$ is selected at N+1, the signal $\bar{\omega}$ is selected at N+2, and the signal $\phi$ is selected at N+3. In the N-th scanning line on the transmitting side, the phase of the signal $\omega$ is modulated by a preset carrier wave. On the receiving side, therefore, the scanning line number is detected to know which phase should be selected among those of the signals $\omega$, $\bar{\omega}$, $\phi$ and $\bar{\phi}$. The recovered carrier wave that is selected is applied to a shift register 26-29 (corresponds to TTL 74164), and the outputs of the shift registers 26-29 are added to addresses of a ROM-1 which is constituted by a ROM 26-10. The detected motion information and the existing/high-resolution discrimination information are also added to addresses of the ROM-1 which produces phase signals as shown in FIG. 28. Namely, the ROM-1 generates a code in which the recovered carrier wave of 0.5 $f_{sc}$ has a phase of any one of 0, $\pi/4$, $\pi/2$, $3\pi/4$, $\pi$, $5\pi/4$, $3\pi/2$, or $7\pi/4$.

When the detected motion information is M1 or M2, or in the case of the signal of the existing television system, the ROM-1 generates a code in which the same phase detect output signal becomes "0", and ceases to reproduce the signals $Y_H'$.

The synchronous detection part adds the signal $Y_H'$ and the phase code of the recovered carrier wave to addresses of a ROM-2 which consists of a ROM 26-10-2. The synchronous detection part then generates synchronously generated output signals relying upon the table look-up as shown in FIG. 28. The signals are latched by a flip-flop 26-8-6. Then, a digital high-pass filter (HPF) 26-21 extracts upper band components, and demodulates them into the original luminance signal components $Y_H$.

Though FIG. 26 illustrates the structure in which one carrier wave is selected from four kinds of carrier waves $\omega, \overline{\omega}, \phi$ and $\overline{\phi}$ in order to extract the recovered carrier wave, it is also allowable to supply a signal $\overline{\omega}$ to the shift register 26-29 at all times, and to supply an output signal of the line number detecting circuit 26-27 as information to the ROM-1, in order to generate phase codes of recovered carrier waves according to a sequence as shown in FIG. 28.

Figure 29:
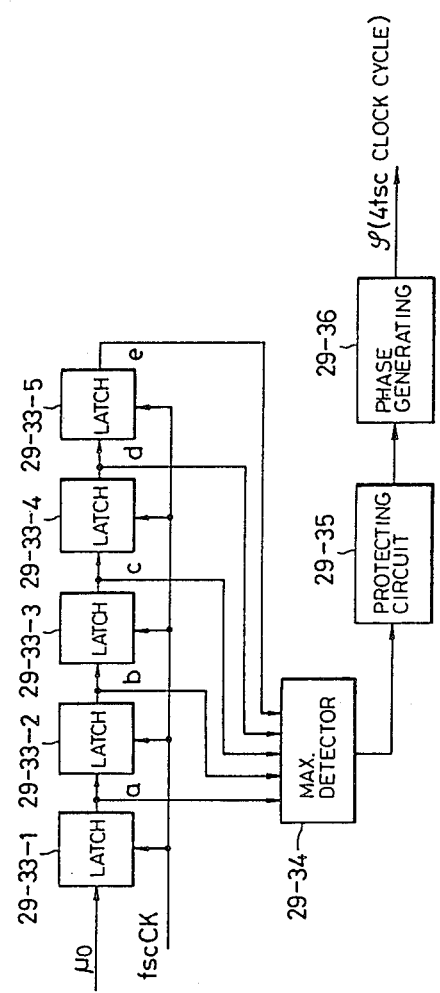
FIG. 29 is a block diagram illustrating one embodiment of a carrier recovery circuit.
Figure 30:
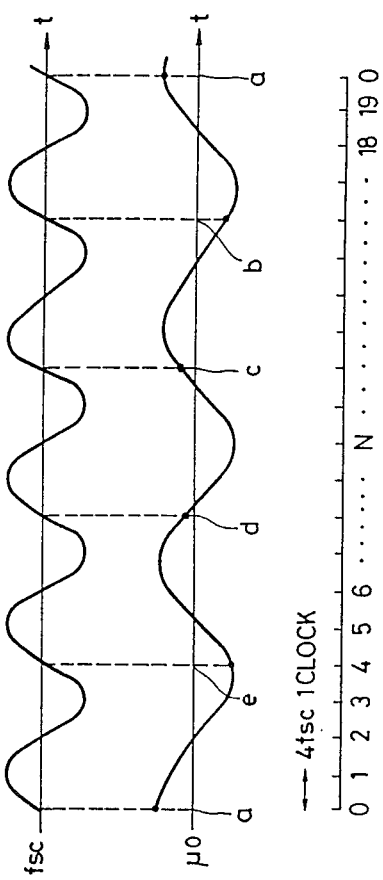
FIG. 30 shows wave forms of carriers fsc and μo.

FIG. 29 shows the structure of a carrier wave ($\mu_0$) recovering circuit 31 according to another embodiment. The clocks $f_{sc}$ and the carrier waves $\mu_0$ have a phase relation as shown in FIG. 30. Therefore, the carrier waves $\mu_0$ are samples at points a1, b1, c1, d1 and e1 of a period $f_{sc}$. The phase of $\mu_0$ can be recovered if the phase of $\mu_0$ is set to be $\pi/2 + 3N\pi/10$ at a moment when the sampled values become the greatest at the point a1.

Latch circuits 33-i (i=1, 2 -----, 5) sample the carrier waves $\mu_0$ at points a, b, c, d and e of the period $f_{sc}$. A maximum value detecting circuit 29-34 detects a timing at which the signal a1 has a maximum value. The timing at which the signal a1 has the maximum value appears every after five periods of the clocks $f_{sc}$. Therefore, the protecting circuit 29-35 detects whether a maximum value that is detected is generating every after this period. When the timings are detected maintaining a correct period, the protecting circuit 29-35 generates a control signal to set the phase of the $\delta$ phase generating circuit 29-36 to $\pi/2$. This operation helps prevent erroneous operation from occurring when the maximum value is erroneously detected due to noise. The $\delta$ phase generating circuit 29-36 periodically generates phase information $\pi/2 +(3N\pi/10$ (N=0, 1, 2, -----, 19) every after a 4 $f_{sc}$ 20 period, and sets the initial value N=0 in response to a control signal from the protecting circuit 29-35.

Figure 31A:
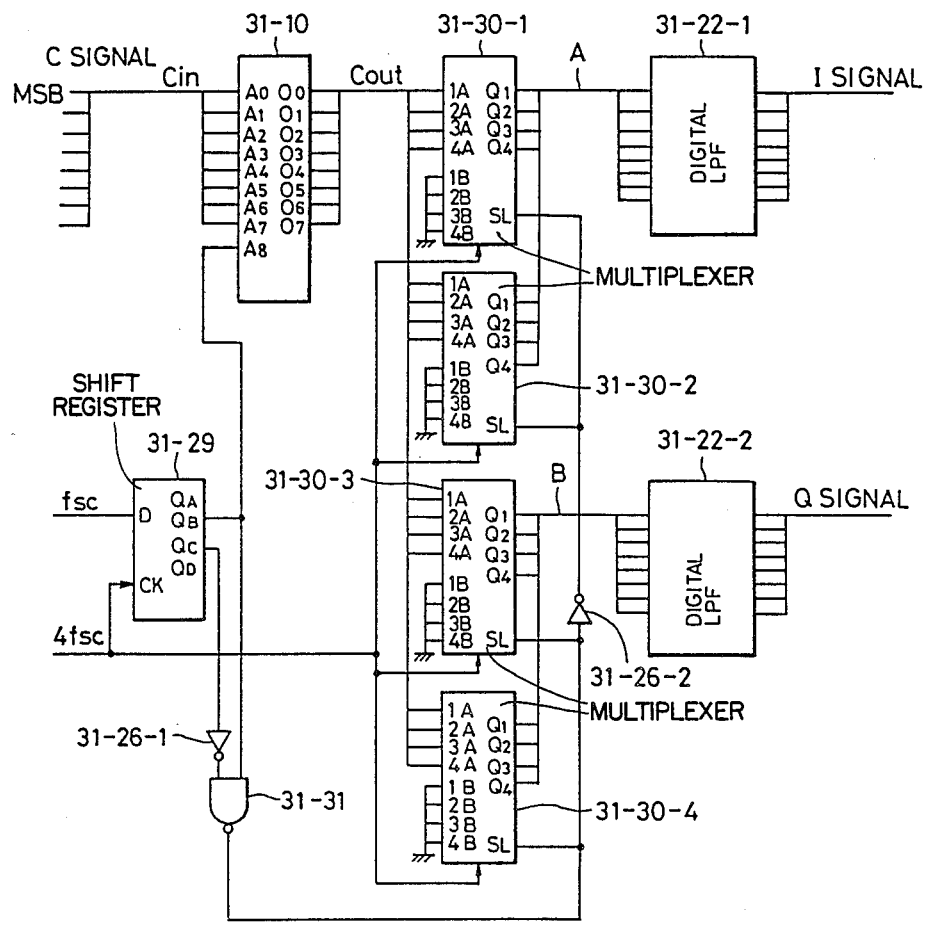
FIGS. 31A and 31B show a block diagram and time chart of a color demodulating circuit, respectively.
Figure 31B:
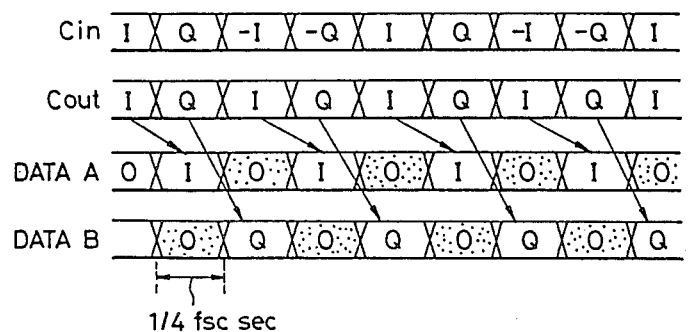

The structure of a circuit for demodulating chrominance signal will now be described in conjunction with FIG. 31A. The synchronous detection during the demodulation is performed by the table look-up using ROM. The A/D converter performs the sampling along the I- and Q-axes. Therefore, the input signals Cin have a time series I, Q, −I, −Q, I, Q, ----- as shown in FIG. 31B. A clock $f_{sc}$ obtained from the synchronous signal separating circuit is adjusted for its phase by a shift register circuit 29, and is input to an address $A_8$ of a ROM 31-10. When the address $A_8$ is "0", the ROM 31-10 produces an output signal Cout which is the same as Cin and when $A_8$ is "1", it produces an output signal Cout which is the same as −Cin, thereby to realize the synchronous detection. The output signal is supplied to inputs (A, 2A, 3A and 4A) on one side of multiplexer circuits 31-30-1, -----, 31-30-4 with storage (corresponds to TTL 74399), the inputs 1B, 2B, 3B and 4B of the other side thereof being all served with a signal "0". In response to control signals produced by an inverter circuit 31-26-1 and a NAND circuit 31-31, the multiplexer circuit 31-30 with storage produces output signals, i.e., produces Cout and "0" alternatingly every after a $4f_{sc}$ clock period. Time series signals of I, O, U, O are obtained on the line A, and time series signals of Q, O, Q, O are obtained on the line B.

The signals on the Line A are input to a digital low-pass filter (LPF) 31-22-1 having a transfer function given by $$\cos^2\pi \frac{f}{2f_{sc}} \cdot \cos^2\pi \frac{f}{4f_{sc}}$$

where low frequency components are extracted and signals I are recovered.

On the other hand, the signals on the line B are input to a digital low-pass filter (LPF) 31-22-2 having a transfer function given by $$\cos^2\pi \frac{f}{f_{sc}} \cdot \cos^2\pi \frac{f}{2f_{sc}} \cdot \cos^2\pi \frac{f}{4f_{sc}}$$

where low frequency components are extracted and signals Q are recovered.

Figure 32:
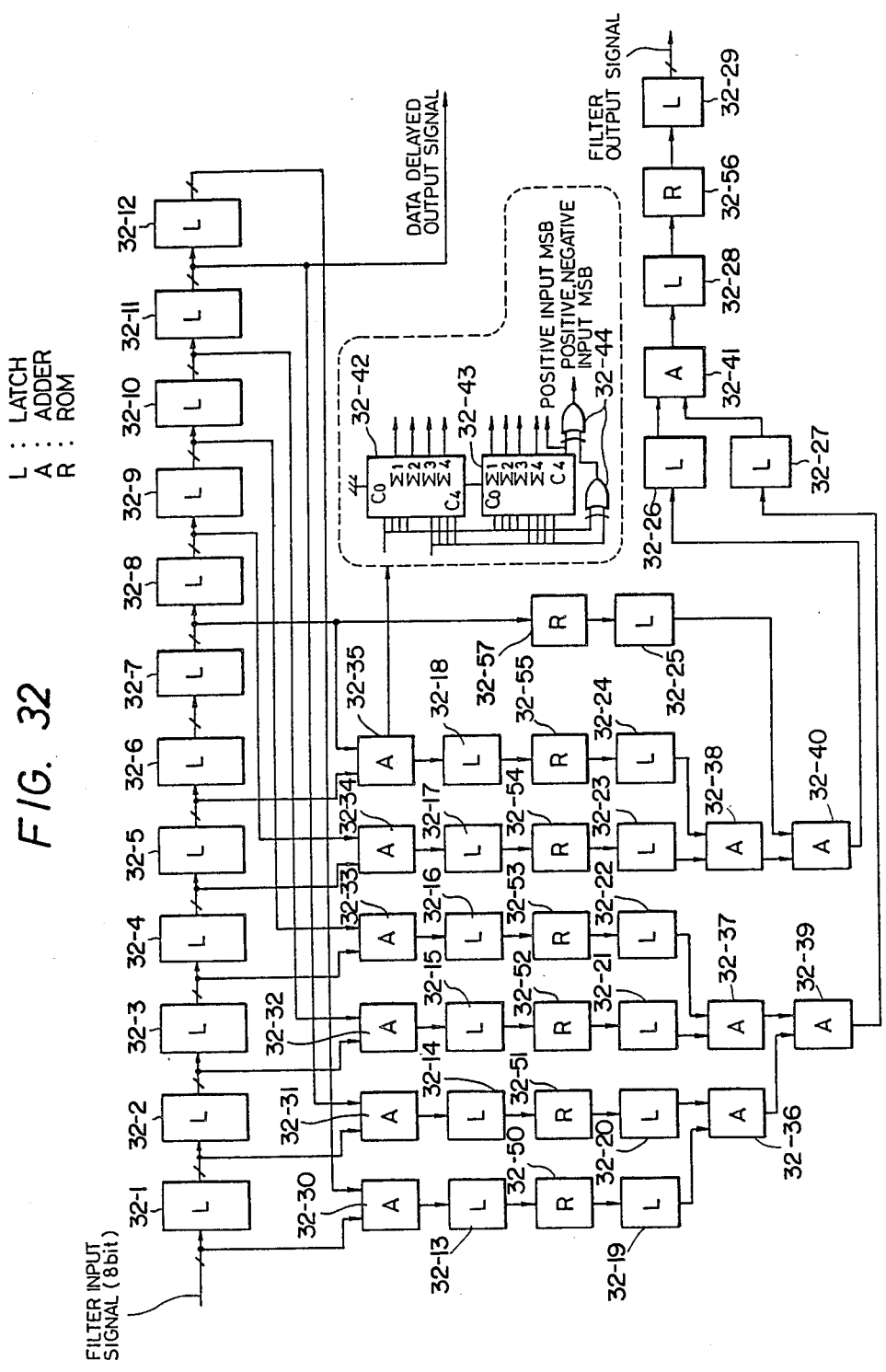
FIG. 32 is a block diagram illustrating one embodiment of a digital filter.

FIG. 32 is a diagram illustrating the structure of a transversal filter for realizing a digital high-pass filter (HPF) or a digital low-pass filter (LPF), having 13 taps. The coefficient multiplication is performed by the table look-up using ROM circuits. By changing the ROM's of tap coefficient multiplication, any characteristics of LPF or HPF can be realized. In order to flatten the phase characteristics of the filter, a symmetrical structure is employed having the same tap coefficients $a_{-n}$ and $a_n$. Latch circuits 32-i (i=1 . . . 29) give delay among the taps. An adder circuit 32-i (I=30 . . . 43) is comprised of a four-bit adder circuit 33-9 as shown enclosed by dotted line. When the input signals consist of positive inputs of from 0 to 255, the adder circuit 33 produces a signal C4 as MSB. When the input signals consist of positive and negative inputs of from 0 (00000000) to 127 (01111111) and −1 (11111111) to −128 (10000000), the adder circuit 33 produces an EXOR signal of the two input MSB signals and C4 signal as MSB. Further, the ROM circuit of filter output signal performs the round off as well as the control of overflow and underflow.

With this structure, furthermore, it is possible to produce even a signal obtained by delaying an input signal by an amount same as the filter output signal.

Figure 33:
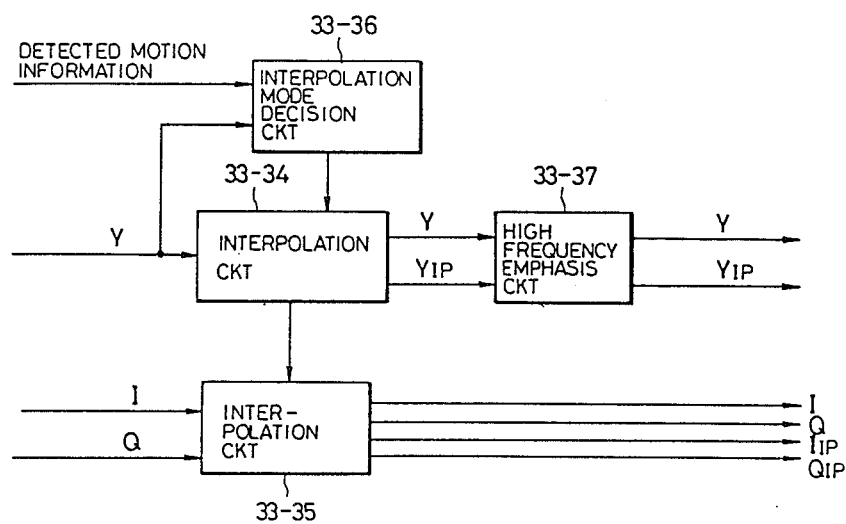
FIG. 33 and 39 are block diagrams illustrating embodiments of interpolation circuits.

FIG. 33 is a block diagram showing the structure of an interpolation circuit which interpolates a scanning line relying upon the signals of a preceding and succeeding scanning lines, the scanning line being missed in the interlaced scanning that is performed to give the display in the form of sequential scanning.

A luminance signal interpolation circuit 33-34 produces an interpolation signal $Y_{IP}$ for the luminance signal, and a color difference signal interpolation circuit 33-35 produces interpolation signals $I_{IP}$ and $Q_{IP}$ for the signals I and Q. The interpolation signals are formed by the adaptive processing of an interpolation mode decision circuit 33-36 which selects an optimum interpolation mode relying upon the detected motion information and the luminance signal Y. Further, a high frequency emphasis circuit 33-37 corrects the contour of the luminance signal.

Figure 34:
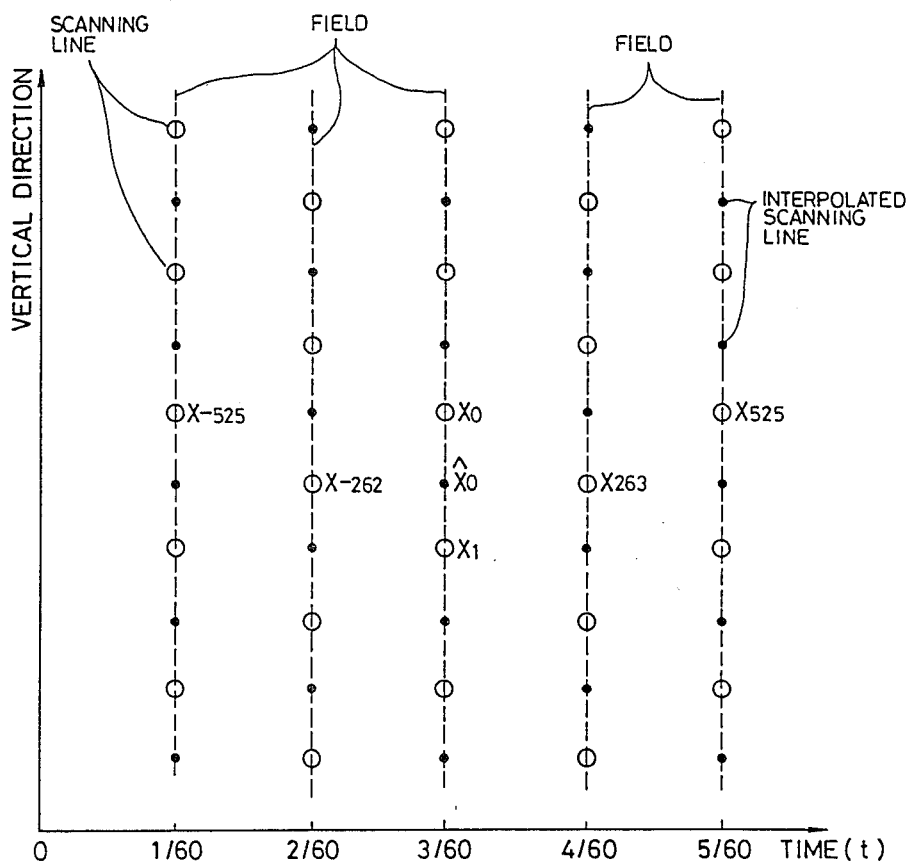
FIGS. 34A and 34B show a characteristic and a table for explaining an operation of the circuit shown in FIG. 33.

FIG. 34A and 34B shows a method of interpolation. Depending upon the motion, the interpolation mode IP1 (during the still picture) performs the interpolation with an interpolation filter having characteristics given by $\cos^2\pi$ (f/2f$_m$)

(where f$_m$=30 Hz). Therefore, the scanning line $\tilde{X}_0$ that is to be interpolated is formed by the operation $\frac{1}{2}(X_{-262}+X_{263})$ relying upon the signals of a scanning line $X_{-262}$ which is 262H before $X_0$ and of a scanning line $X_{263}$ which is 263H after $X_0$.

The interpolation mode IP3 (during the motion picture) performs the interpolation with an interpolation filter having characteristics given by $$\cos^2\pi \frac{\nu}{2\nu_1}$$

where $\nu_1=525/2$, $\nu$ represents a vertical frequency). In this mode, therefore, the scanning line $X_0$ to be interpolated is formed by the operation $\frac{1}{2}(X_0+X_1)$.

Further, the interpolation mode IP2 (slowly moving picture) performs the interpolation with an interpolation filter having characteristics given by $$\cos^2\pi \frac{\nu}{2\nu_1}\left(1+\sin^2\pi \frac{\nu}{2\nu_1}\right)\cdot\cos^2\pi \frac{f}{2f_m}\left(1+\sin^2\pi \frac{f}{2f_m}\right).$$

As for the luminance signals Y, the interpolation modes are limited to three kinds, i.e., IP$_1$, IP$_2$ and IP$_3$ and as for the color difference signals I and Q, the interpolation modes are limited to two kinds, i.e., IP$_1$ and IP$_3$, in order to reduce the size of the circuit.

Figure 35:
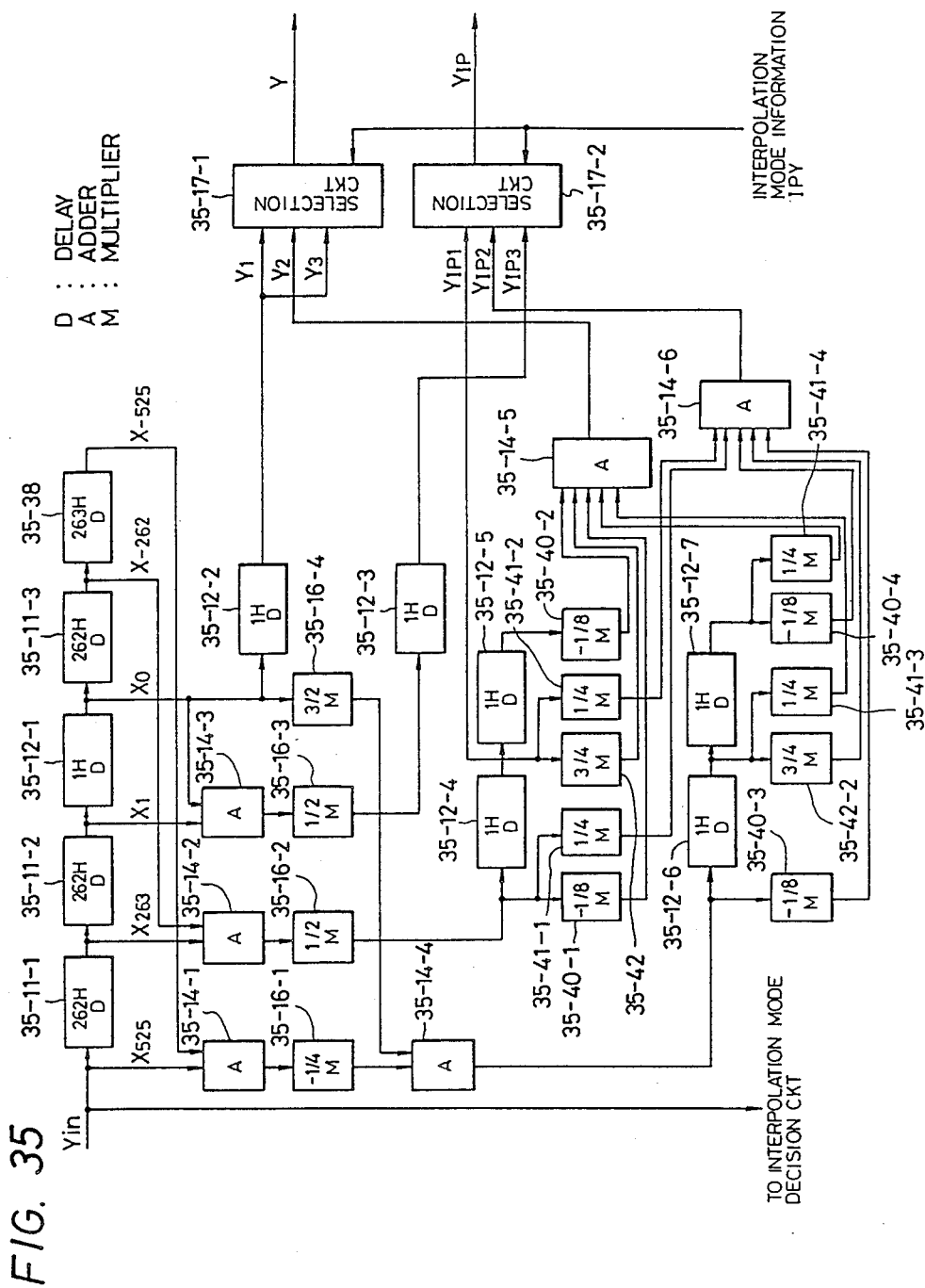
FIG. 35 is a block diagram illustrating one embodiment of a luminance signal interpolation circuit.

FIG. 35 illustrates the structure of the luminance signal interpolation circuit. A combination of 262H delay circuits 35-11-i, 1H delay circuits 35-12-1 and a 263H delay circuit 35-38, generates signals that corresponds to the scanning lines $X_0$, $X_1$, $X_{263}$, $X_{525}$, $X_{-262}$ and $X_{-525}$ shown in FIG. 34Δ. Through adders 35-14-i and $\frac{1}{2}$ multipliers 35-10-i, these signals form interpolation signals $Y_{IP1}=\frac{1}{2}(X_{-262}+X_{263})$ that correspond to the interpolation modes IP1 and IP3. In this case, the signal, the signal of $X_0$ is directly used as $Y_1$ and $Y_3$.

The signals $Y_2$ and interpolation signals $Y_{IP2}$ corresponding to the interpolation mode IP2 are produced through the circuit structure consisting of adders 35-14-i, $-\frac{1}{4}$ multipliers 35-15-i, 3/2 multipliers 35-39-i, $-\frac{1}{8}$ multipliers 35-40-i, $\frac{1}{4}$ multipliers 35-41-i and $\frac{3}{4}$ multipliers 35-42-i. The selection circuits 35-17-1 and 35-17-2 select $Y_1$ and $Y_{IP1}$ when the interpolation mode information IPY is IP1, select $Y_2$ and $Y_{IP2}$ when the interpolation mode information IPY is IP2, select $Y_3$ and $Y_{IP3}$ when the interpolation mode information IPY is IP3, and produces output signals Y and $Y_{IP}$.

Figure 36A:
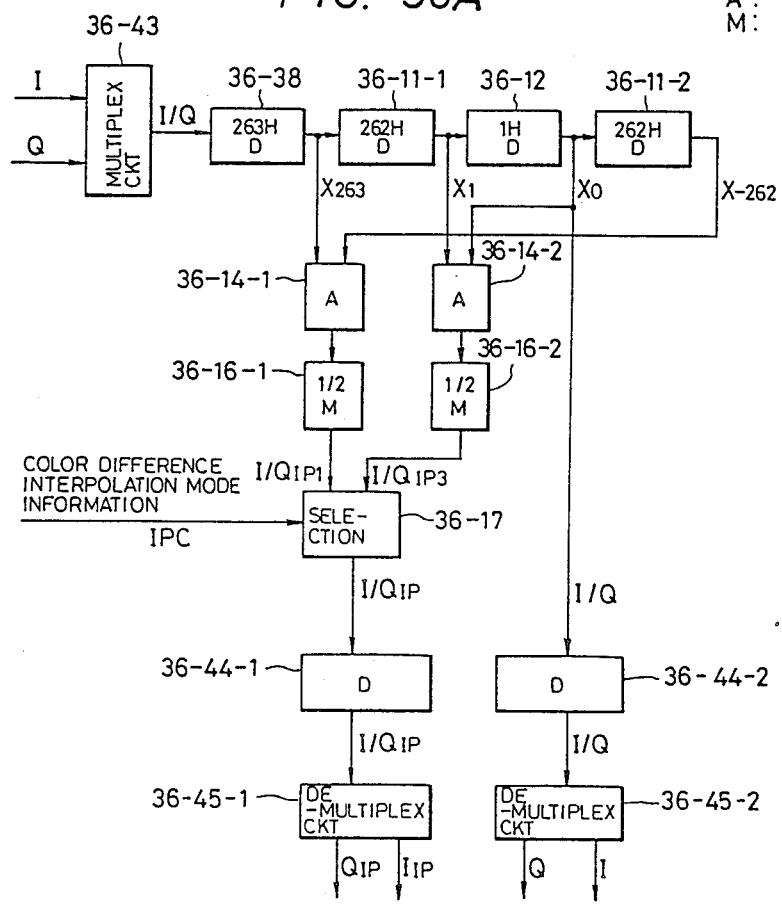
FIG. 36A is a block diagram illustrating one embodiment of a color difference signal interpolation circuit.
Figure 36B:
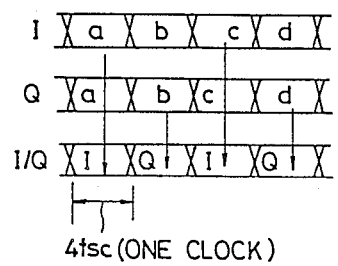
FIGS. 36B and 36C show time charts for explaining an operation of the circuit shown in FIG. 36A.
Figure 36C:
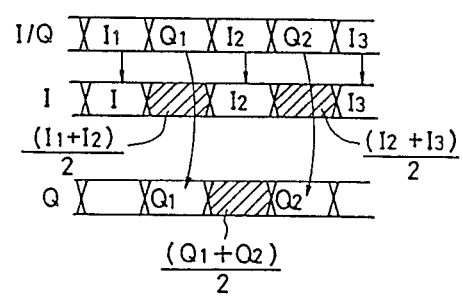

FIG. 36A illustrates the structure of the collor difference signal interpolation circuit. The signals I and Q have frequency bands that are as low as 1.5 MHz and 0.5 MHz, respectively. In order to reduce the size of the circuit, therefore, the processing is effected with data of time series of I/Q signals obtained by alternatingly picking up signal I and signal Q every after a time slot of $4f_{sc}$ as shown in FIGS. 36B and 36C.

Response to the signals I and Q, signals of $X_0$, $X_1$, $X_{263}$ and $X_{-262}$ necessary for interpolation are generated by the combination of a 263H delay circuit 36-38, 262H delay circuits 36-11-1 and 36-11-2, and a 1H delay circuit 36-12.

As interpolation signals corresponding to color difference signal interpolation mode information IPC, there are generated signals $I/Q_{IP2}=\frac{1}{2}(X_{263}+X_{-262})$ and $I/Q_{IP3}=\frac{1}{2}(X_0+X_1)$ through adders 36-14-1 and 36-14-2 and $\frac{1}{2}$ multipliers 36-16-1 and 36-16-2. The selection circuit 36-17 produces as $I/Q_{IP}$ a signal that corresponds to the interpolation mode information IPC. Further, delay amounts of luminance signals generated through the high frequency emphasis circuit are compensated through delay circuits 36-44-1 and 36-44-2, and are converted through demultiplex circuits 36-45-1 and 36-45-2 into signals I, Q and signals $I_{IP}$, $Q_{IP}$ of the original time series as shown in FIGS. 36C and 36B. In this time series conversion, the signals of the hatched portions are interpolated by an average of preceding and succeeding picture elements Ii and Ii+1 or by the picture element Ii.

Figure 37:
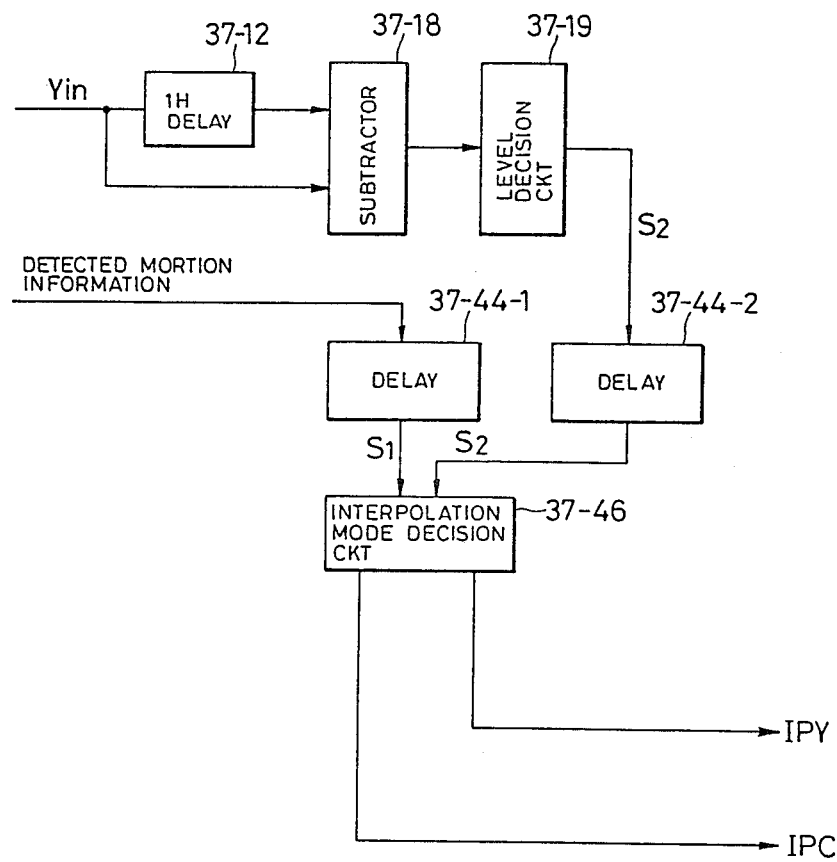
FIG. 37A is a block diagram illustrating one embodiment of an interpolation mode decision circuit.
FIG. 37B shows a relationship between interpolation modes and motion of picture.

FIG. 37A illustrates the structure of an interpolation mode decision circuit. A luminance signal Yin and a signal delayed by one scanning line through a 1H delay circuit 37-12 are subjected to the subtraction through a subtractor 37-18, and the result is compared by a level decision circuit 37-19 with a threshold value $\Delta th_{IP}$. When the difference is within $\pm$ $\Delta th_{IP}$, the level decision circuit 37-19 produces an output signal $S_2$ which is "0". When the difference is greater than $\pm$ $\Delta th_{IP}$, the level decision circuit produces a signal "1". The detected motion information explained in conjunction with $Y_L$, C, $Y_H'$ separation, and the output signal $S_2$ are compensated by the delayed amount of the interpolation circuit through delay circuits 37-44-1 and 37-44-2, and are input to an interpolation mode decision circuit 37-46. As tabulated in FIG. 37β, the interpolation mode decision circuit 37-46 sets the interpolation mode information IPY and IPC to the mode IP1 when the detected motion information pertains to the still mode MO. When the detected motion informations are M1 and M2, on the other hand, the IPC is set to the mode IP3, and the IPY is set to either one of IP2 or IP3 depending upon the signal $S_2$. When the signal $S_2$ is 0 in the IPY, it is so determiend that the picture has small vertical frequency components but has a strong correlation in the vertical direction, and the interpolation mode is set to IP3.

Figure 38:
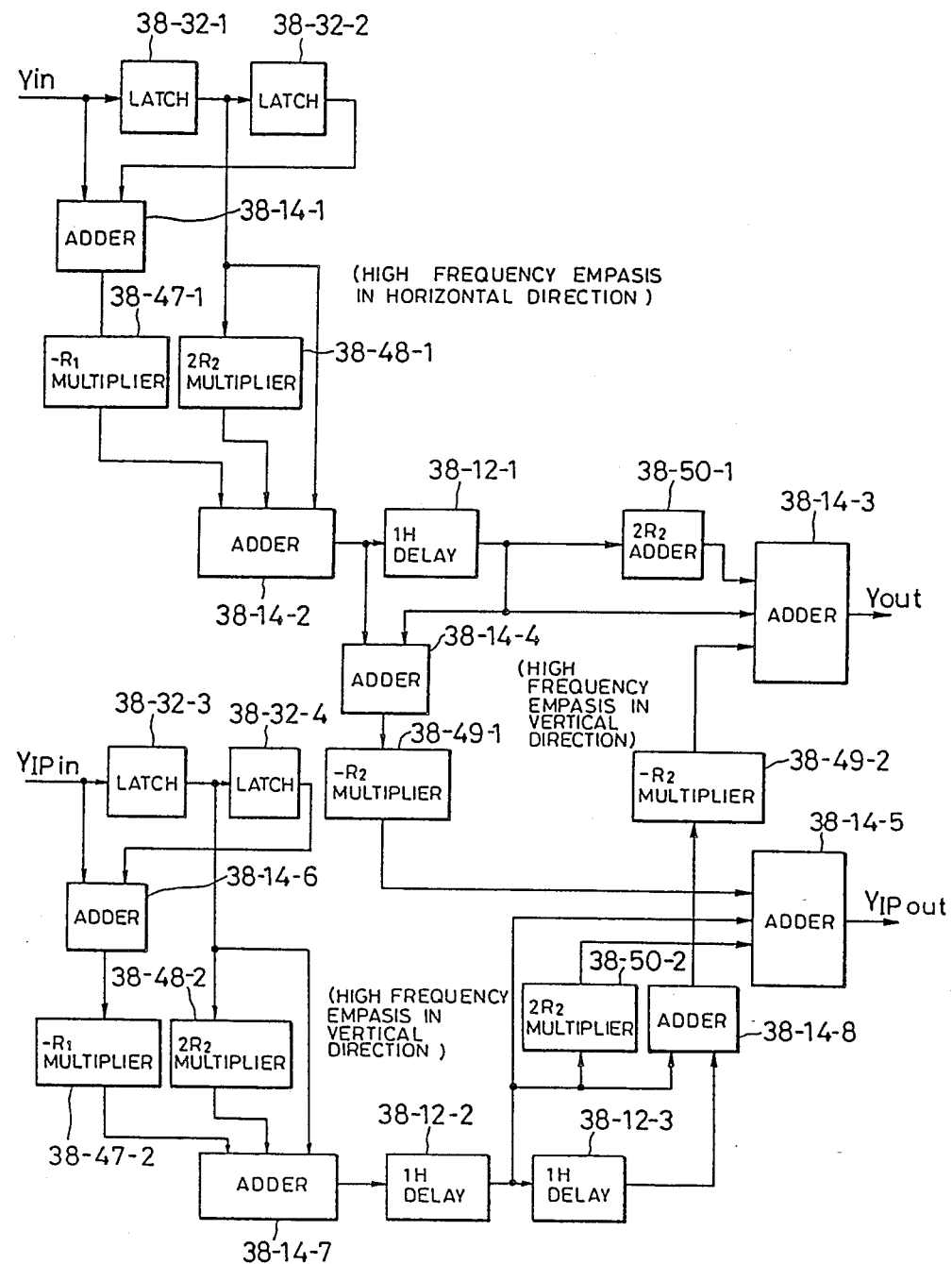
FIG. 38 is a block diagram illustrating one embodiment of a high frequency emphasis circuit.

FIG. 38 illustrates the structure of the high frequency emphasis circuit which performs high frequency emphasis maintaining characteristics of $$1+4k_1\sin^2\pi \frac{f}{2f_{sc}}$$

in the horizontal direction and maintaining characteristics of $$1+4k_2\sin^2\pi \frac{\nu}{2\nu_1}$$

in the vertical direction. The signals $Y_1$ and $Y_{IP}$ are subjected to the high frequency emphasis in the horizontal direction through latch circuits 38-32-i, adders 38-14-i, $-k_1$ multipliers 38-47-i, and $2k_1$ multipliers 38-48-i. Then, the high frequency emphasis is effected in the vertical direction through 1H delay circuits 38-12-i, $-k_2$ multipliers 38-49-i, $2k_2$ multipliers 38-50-i, and adders 38-14-i.

Figure 39:
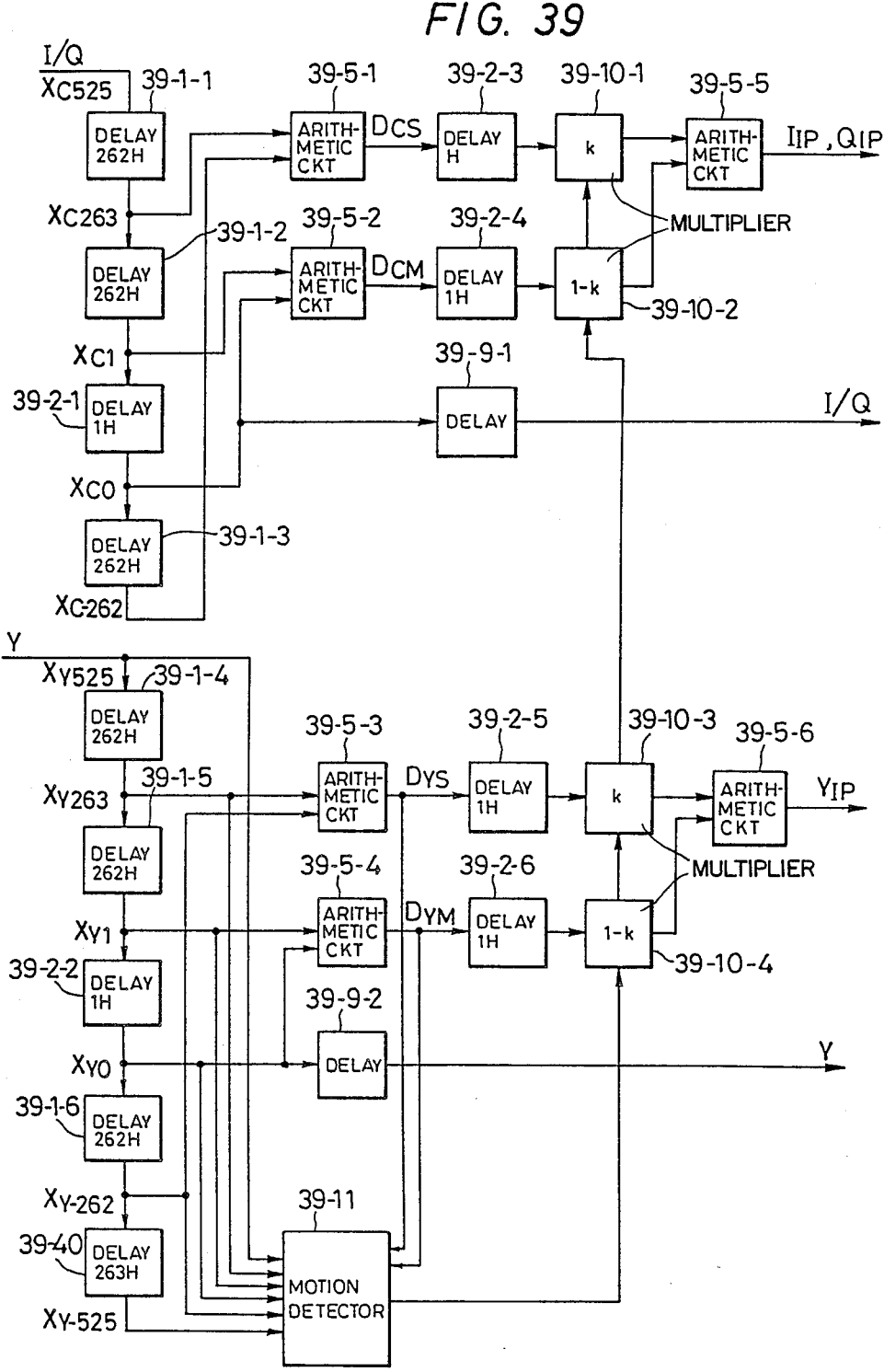

FIG. 39 illustrates the interpolation circuit according to another embodiment. The demodulated color difference signals I and Q constitute color difference signals I/Q that are alternatingly multiplexed in a time divided manner for each $4f_{sc}$ clock. This structure makes it possible to simplify the circuit compared with the case where the signals I and Q are independently treated.

A variety of signals necessary for the interpolation are produced by the combination of 262-line delay circuits 39-1-i and 1-line delay circuits 39-2-i.

As an interpolation signal which corresponds to the scanning line $X_{CO}$, an arithmetic circuit 39-5-1 produces an interpolation signal $D_{CS}$ that corresponds to a still picture through an operation $\frac{1}{2}(X_{C-262}+X_{C263})$ relying upon a signal $X_{C-262}$ of a scanning line of 262 lines before and a signal $X_{C263}$ of a scanning line of 263 lines after.

Another arithmetic circuit 39-5-2 produces an interpolation signal $D_{CM}$ corresponding to a moving picture through an operation $\frac{1}{2}(X_{C0}+X_{C1})$ relying upon a signal $X_{C1}$ of a scanning line of one line after and a signal $X_{C0}$. These signals are delayed by one line through 1-line delay circuits 39-2-3 and 39-2-4, multiplied by coefficients k and 1-k corresponding to the movements through multiplier circuits 39-10-1 and 39-10-2, and are added up together through an arithmetic circuit 39-5-5 to obtain a signal for an interpolation scanning line.

As for luminance signals Y like color difference signals I/Q, signals necessary for the interpolation are generated through a combination of 262-line delay circuits 39-1-i, 1-line delay circuits 39-2-i, and a 263-line delay circuit 39-40.

The arithmetic circuit 39-5-3 performs the operation $\frac{1}{2}(X_{Y263}+X_{Y-262})$ relying upon the signals $X_{Y263}$ and $X_{Y-262}$, to produce an interplation signal $D_{YS}$ that corresponds to a still picture. Another arithmetic circuit 39-5-4 performs the operation $\frac{1}{2}(X_{Y0}+Y_{Y1})$ to produce an interpolation signal $D_{YM}$ that corresponds to a moving picture. These signals are delayed by one line through 1-line delay circuits 39-25 and 39-26 multiplied by coefficients k and 1-k corresponding to the movements through multiplier circuits 39-10-3 and 39-10-4, and are added up together through an arithmetic circuit 39-5-6 to obtain a signal $Y_{IP}$ of luminance signal for an interpolation scanning line.

The motion detecting circuit 39-11 generates a motion coefficient k using a lumiance signal $X_{Yi}$ and signals $D_{YS}$ and $D_{YM}$.

Signals of which the delay quantities are adjusted by the delay circuit 39-9-2 are used as signals for main scanning lines (scanning lines which do not perform the interpolation).

Figure 40:
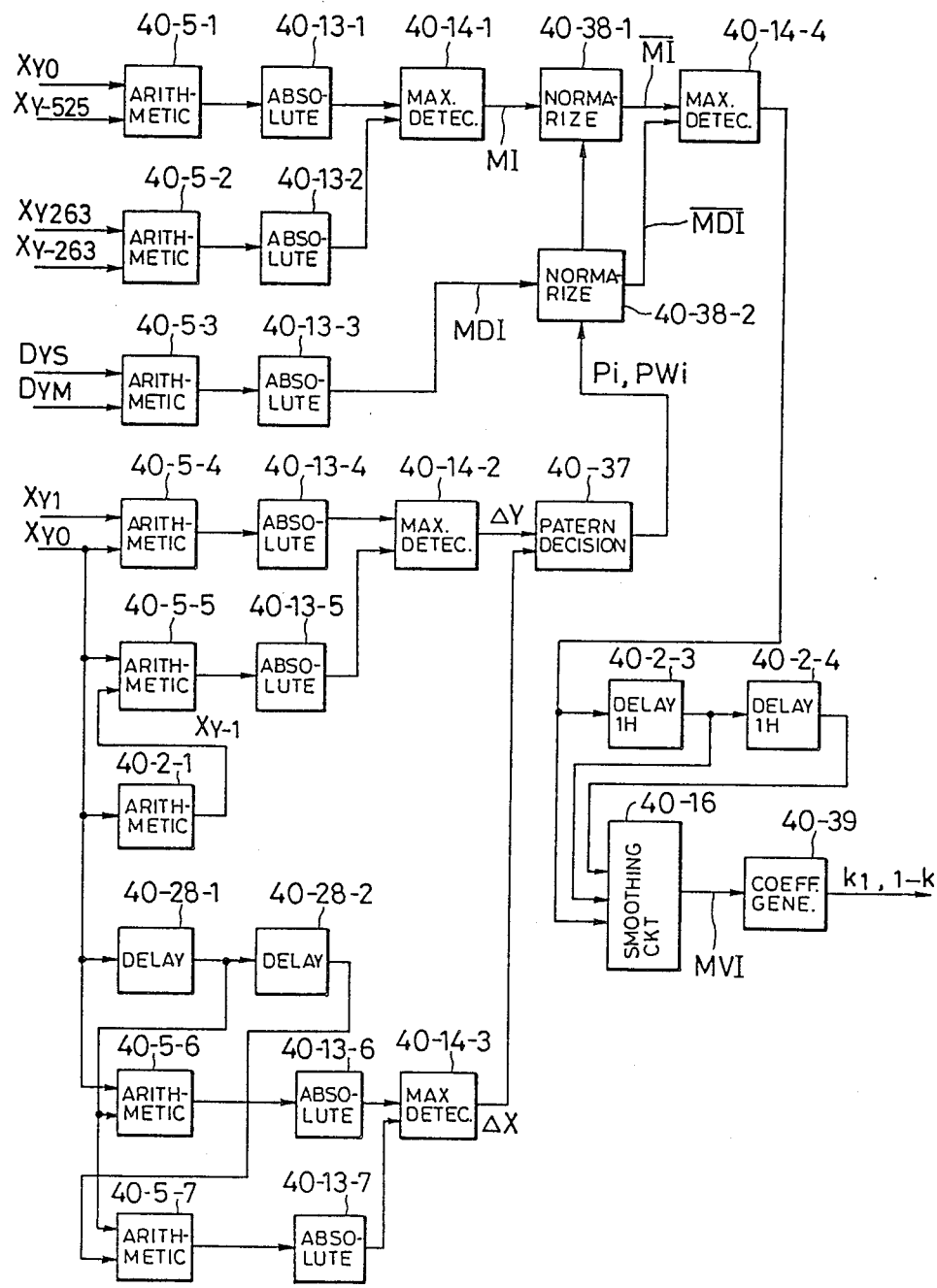
FIG. 40 is a block diagram illustrating one embodiment of a motion detecting circuit for scanning line interpolation.

FIG. 40 illustrates an embodiment of a motion detecting circuit for scanning line interpolation. The operation will be described hereinbelow.

First, an arithmetic circuit 40-5-1 performs the operation $X_{Y0}-X_{Y-525}$, and arithmetic circuit 40-5-2 performs the operation $X_{Y263}-X_{Y-262}$, absolute value circuits 40-13-1 and 40-13-2 quantize the absolute values maintaining characteristics shown in FIG. 18A, and a maximum value detecting circuit 40-14-1 selects a larger value to generate motion information MI.

An arithmetic circuit 40-5-3 calculates a difference $D_{YS}-D_{YM}$ between the interpolation signal $D_{YS}$ during the still picture and the interpolation signal $D_{YM}$ during the moving picture, and an absolute value circuit 4013-3 quantizes the absolute value to generate a signal MDI.

Moreover, changes in the horizontal and vertical directions are detected relying upon the signals $X_{Y0}$ and $X_{Y1}$. First, an arithmetic circuit 40-5-4 performs the operation $X_{Y0-Y1}$, an absolute value circuit 40-13-4 quantize the output of the circuit 40-5-4, an arithmetic circuit 40-5-5 performs the operation $X_{Y0}-X_{Y1}$ or $X_{Y0}-X_{Y-1}$ using a signal $X_{Y-1}$ delayed by one line through a 1-line delay circuit 40-2-1, an absolute value circuit 40-13-5 quantizes the absolute value thereof, a maximum value detecting circuit 40-14-2 detects a maximum value between the two as a vertical change component $\Delta Y$. Further, an arithmetic circuit 40-5-6 finds a differential signal between the neighboring picture elements in the horizontal direction relying upon a signal $X_{Y0}$ and a signal obtained through a 1-picture element delay circuit 40-28-1, arithmetic circuit 40-5-7 also times a difference between an input and an output of delay circuit 4-28-2 absolute value circuit 40-13-6 and 40-13-17 quantize the absolute values thereof, and a maximum value detecting circuit 40-14-3 detects a maximum value between the two as a horizontal change component $\Delta X$.

Relying upon these signals $\Delta Y$ and $\Delta X$, a picture pattern decision circuit 40-37 classifies the pattern into three regions I, II and III as shown in FIG. 41. The region I corresponds to a vertical pattern that produces pattern information $P_1$ and change component $PW_1=\Delta Y$. The region II corresponds to a tilted pattern which produces pattern information $P_2$ and $PW_2=\sqrt{\Delta X^2+\Delta Y^2}$. Further, the region III corresponds to a horizontal pattern which produces pattern information $P_3$ and $PW_3=\Delta X$. These operations can be easily realized using ROM's or the like.

In response to informations $P_i$, normalizing circuits 40-38-2 and 40-38-1 normalizes the signals MI and MDI maintaining characteristics as shown in FIG. 42, and produces the signals $\overline{MI}$ and $\overline{MDI}$, wherein the diagrams (a), (b) and (c) show characteristics for the signal MI, and the diagrams (d) (e) and (f) show characteristics for the signal MDI. A maximum value detecting circuit 40-14-4 selects a maximum value between the two. This signal and a signal delayed through 1-line delay circuits 40-2-3 and 40-2-4 are smoothed in the horizontal and vertical directions by a smoothing circuit 40-16 to produce motion information MVI.

A motion coefficient generating circuit 40-39 generates motion coefficients k and 1-k for the motion information MVI maintaining characteristics as shown in FIG. 43.

Figure 44:
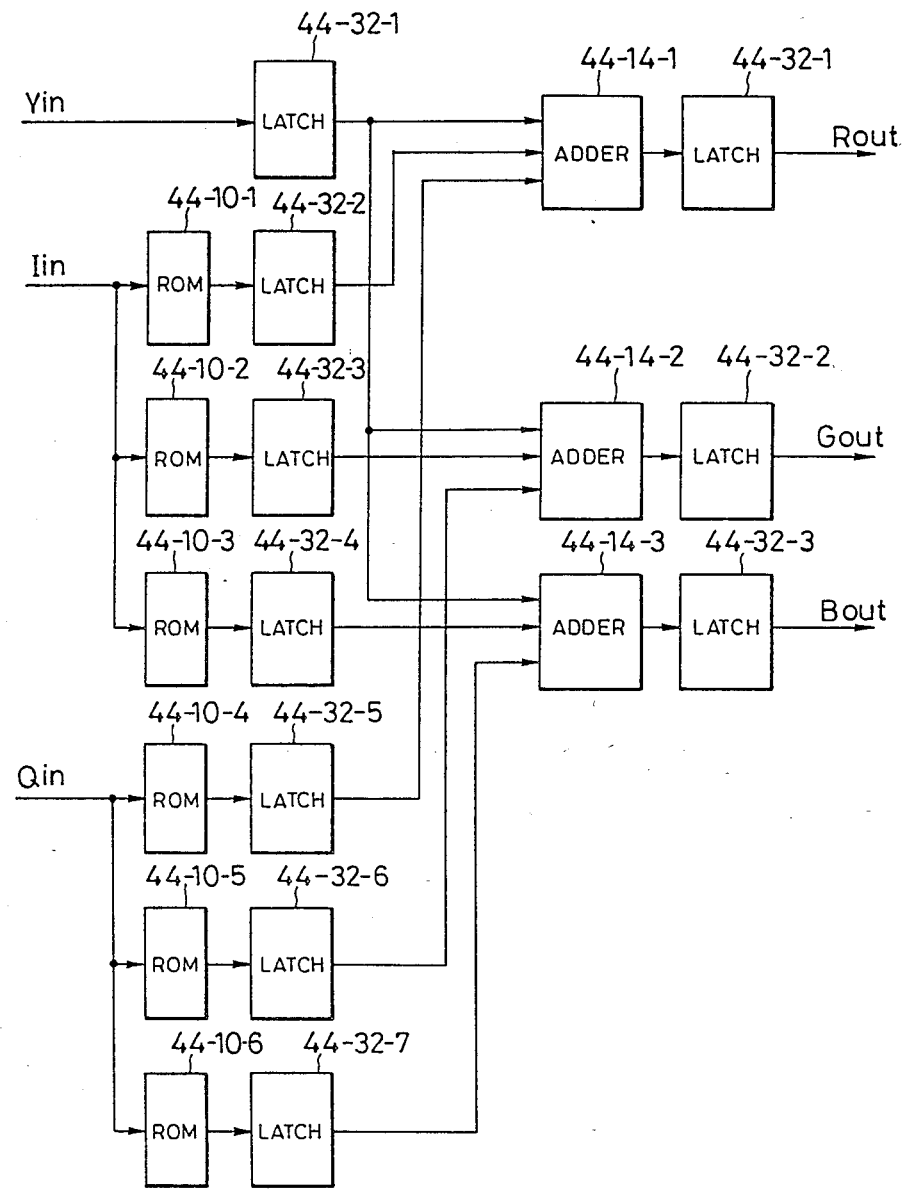
FIG. 44 is a block diagram illustrating one embodiment of a R.G.B. conversion circuit.

In the foregoing was described the structure of the interpolation circuit. The structure of an RGB conversion circuit 10-2-10 will now be described in conjunction with FIG. 44. This circuit converts the luminance signal Y and color difference signals I and Q into three primary color signals R, G and B in accordance with the following relations.

$R = Y + 0.96I + 0.62Q$ $G = Y - 0.27I - 0.65Q$ $B = Y - 1.1I + 1.7Q$

ROM's 44-10-i multiply the color difference signals I and Q by coefficients 0.96I, −0.27I, −1.1I, 0.62Q, −0.65Q and 1.7Q in compliance with the table look-up. The output signals are latched by latch circuits 44-32-i, and adders 44-14-i add, for example, to the signals Y the signals that correspond to 0.96I and 0.62Q, to generate signals R. The outputs of adders 44-14-1, 44-14-2 and 44-14-3 are outputted through latch circuits 44-32-8, 44-32-9 and 44-32-10 respectively.

Here, one pairs of the RGB conversion circuit are required for signals Y, I and Q and for $Y_{IP}$, $I_{IP}$, $I_{IP}$ and $Q_{IP}$ in pairs.

Figure 45:
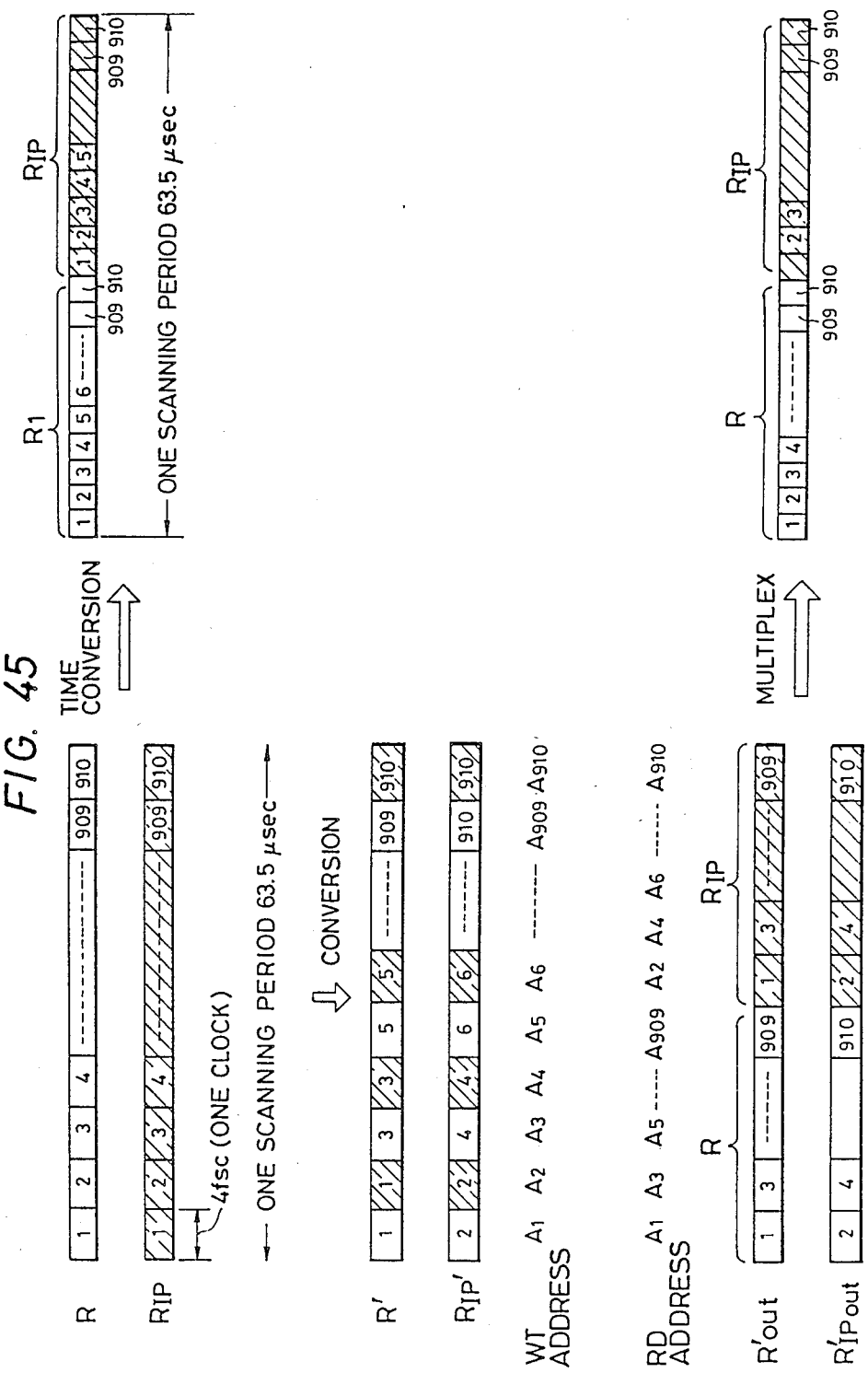
FIG. 45 shows a signal construction for explaining an operation of a time axis conversion circuit 10-2-11.

Next, operation and principle of the time axis conversion circuit 10-2-11 in FIG. 10 will be described in conjunction with FIG. 45. The function of this circuit is to compress the time axis into one-half for the three primary color signals, for example, for the signals R, $R_{IP}$ in a time series over one scanning line period (63.5 μsec), in order to obtain time series signals R, $R_{IP}$ in one scanning period as shown. In order to realize the time axis conversion, first, the signals R and $R_{IP}$ are converted into time series R′ and $R_{IP}'$ as shown in FIG. 45. The writing is effected onto the one-line memory according to addresses of a time series $A_1$, $A_2$, $A_3$, -----, $A_{909}$, $A_{910}$. During the reading operation from the 1-line memory, on the other hand, the time series of addresses is changed in a way of $A_1$, $A_3$, $A_5$, -----, $A_{909}$, $A_2$, $A_4$, $A_6$, -----, $A_{910}$ to form time series signals Rout′, $R_{IPout}'$ as shown in FIG. 45. These signals are multiplexed to form desired time series signals of which the time axes are converted.

Figure 46:
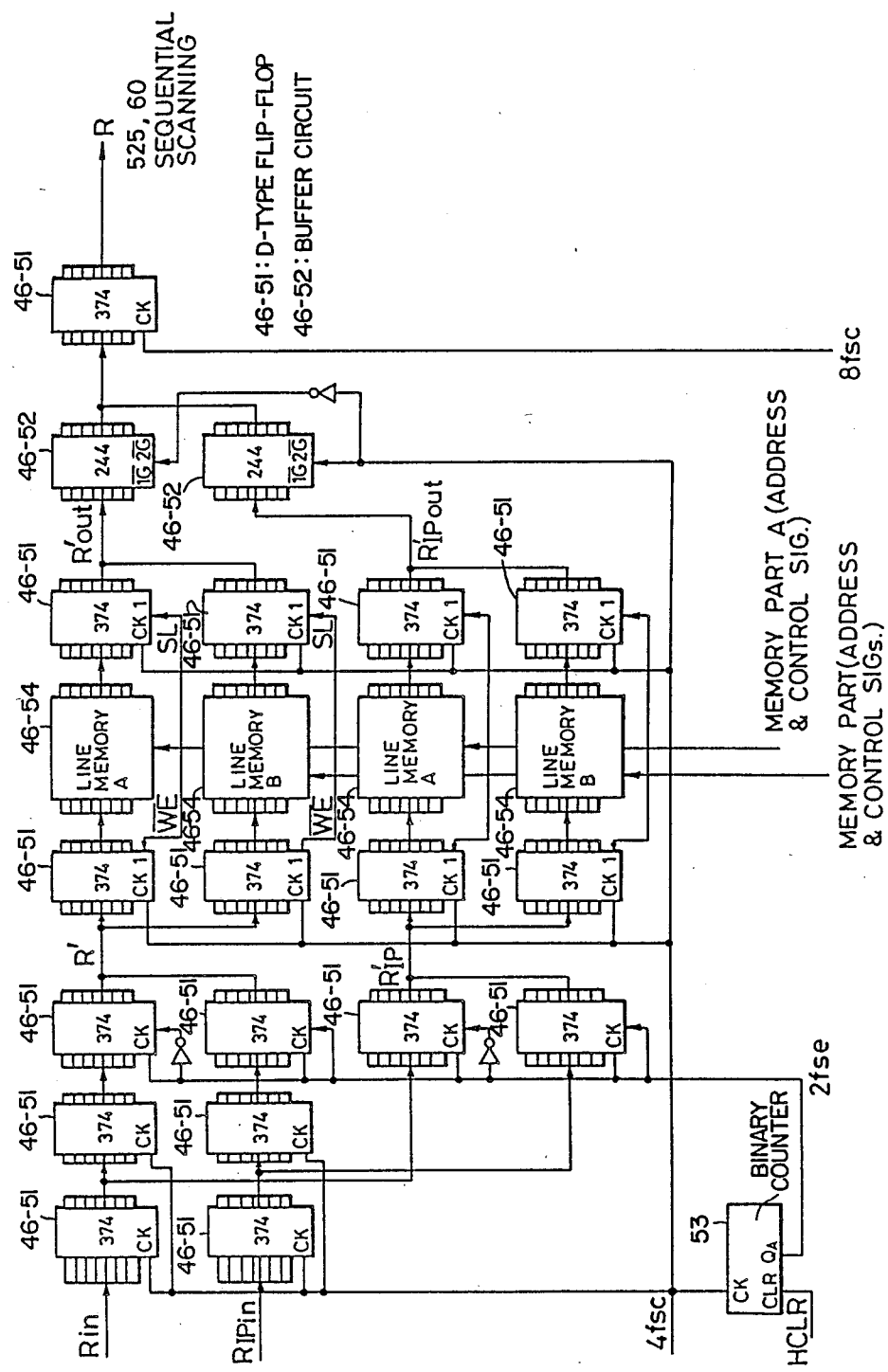
FIG. 46 is a block diagram illustrating one embodiment of a time axis conversion circuit.
Figure 47:
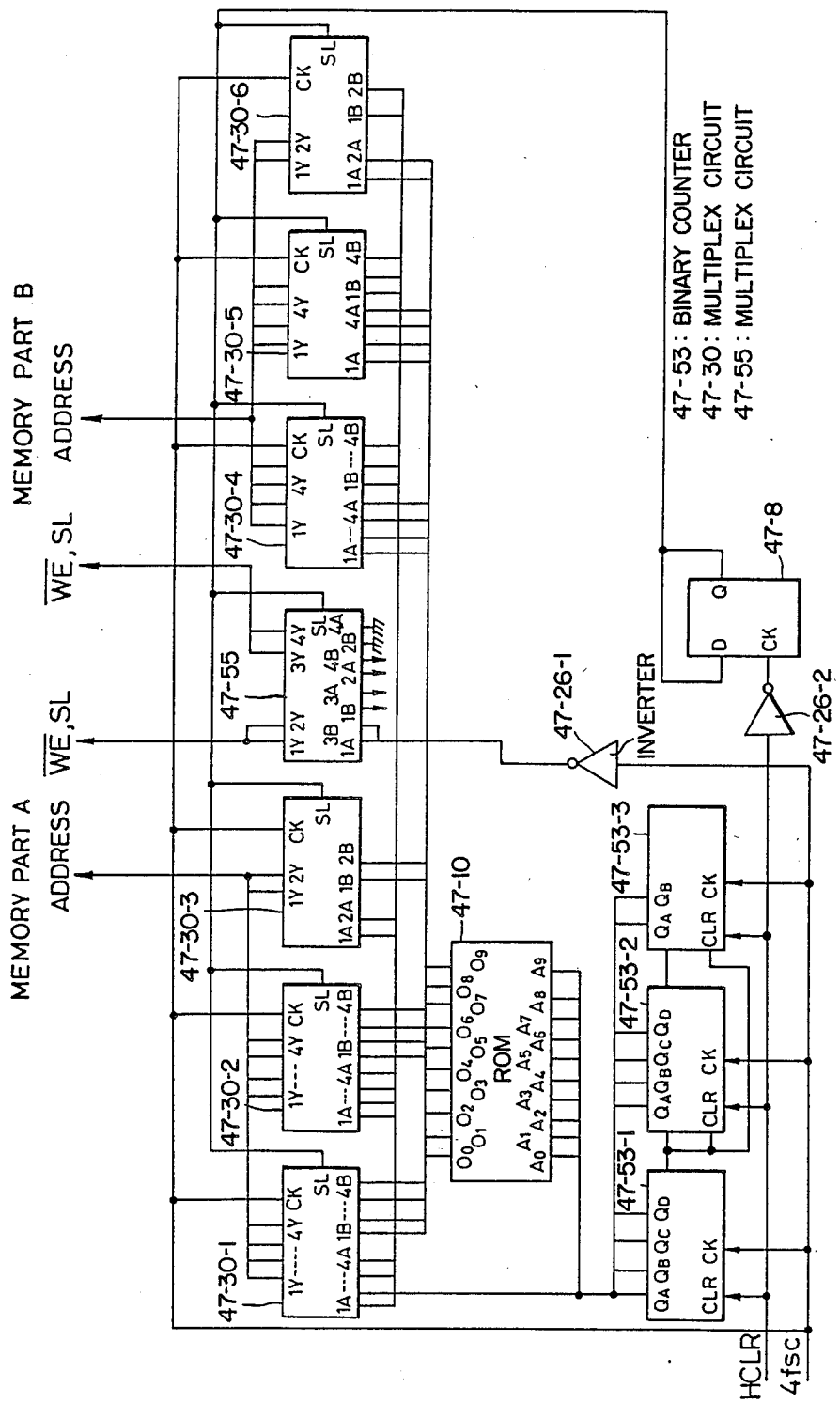
FIG. 47 is a block diagram illustrating one embodiment of a control signal generating circuit in the time axis conversion circuit.

FIG. 46 shows the structure of the time axis conversion circuit, and FIG. 47 shows the structure of an address control circuit of memory part.

The time series signals R′ and $R_{IP}'$ shown in FIG. 45 are formed by using 2 $f_{sc}$ signals produced by D-type flip-flop circuits 51 (correspond to 74374) and a binary counter circuit 53 shown in FIG. 46. The binary counter circuit 53 is reset by an HCLR pulse of which the width corresponds to a 4 $f_{sc}$ clock after every scanning period to stabilize the phase of the 2 $f_{sc}$ signals.

The R′ and $R_{IP}'$ signals of which the time series are converted are written onto 1-line memories 54. The 1-line memories perform the writing operation and reading operation alternatingly for each scanning line. When the 1-line memory A is performing the writing operation, the 1-line memory B performs the reading operation. The signals Rout′, $R_{IPout}'$ read from the 1-line memories are multiplexed through buffer circuits 52 (correspond to 74244) at a period of 8 $f_{sc}$. By latching these signals in the D-type flip-flop circuit 51 with locks of 8 $f_{sc}$, there are obtained the signals R in the form of 525 scanning lines, 60 frames and sequential scanning, that are subjected to desired time axis conversion.

The signals G and B are also subjected to the time axis conversion through the same circuit structure.

FIG. 47 shows the structure of a circuit which generates address signals and WE signals for controlling the 1-line memories. Binary counter circuits 53-1, 53-2 and 53-3 are reset by a clock HCLR for every scanning line, and effect the count up with a clock of 4 $f_{sc}$. The output signals are used as addresses during the operation for writing onto the memories. A ROM 47-10 generates addresses during the reading operation, and multiplex circuits 47-30-i (i=1 . . . . 6) with storage select addresses during the writing operation and reading operation. A multiplexer 47-55 (corresponds to 74157) generates $\overline{WE}$ pulses and I/O control signals.

Figure 48:
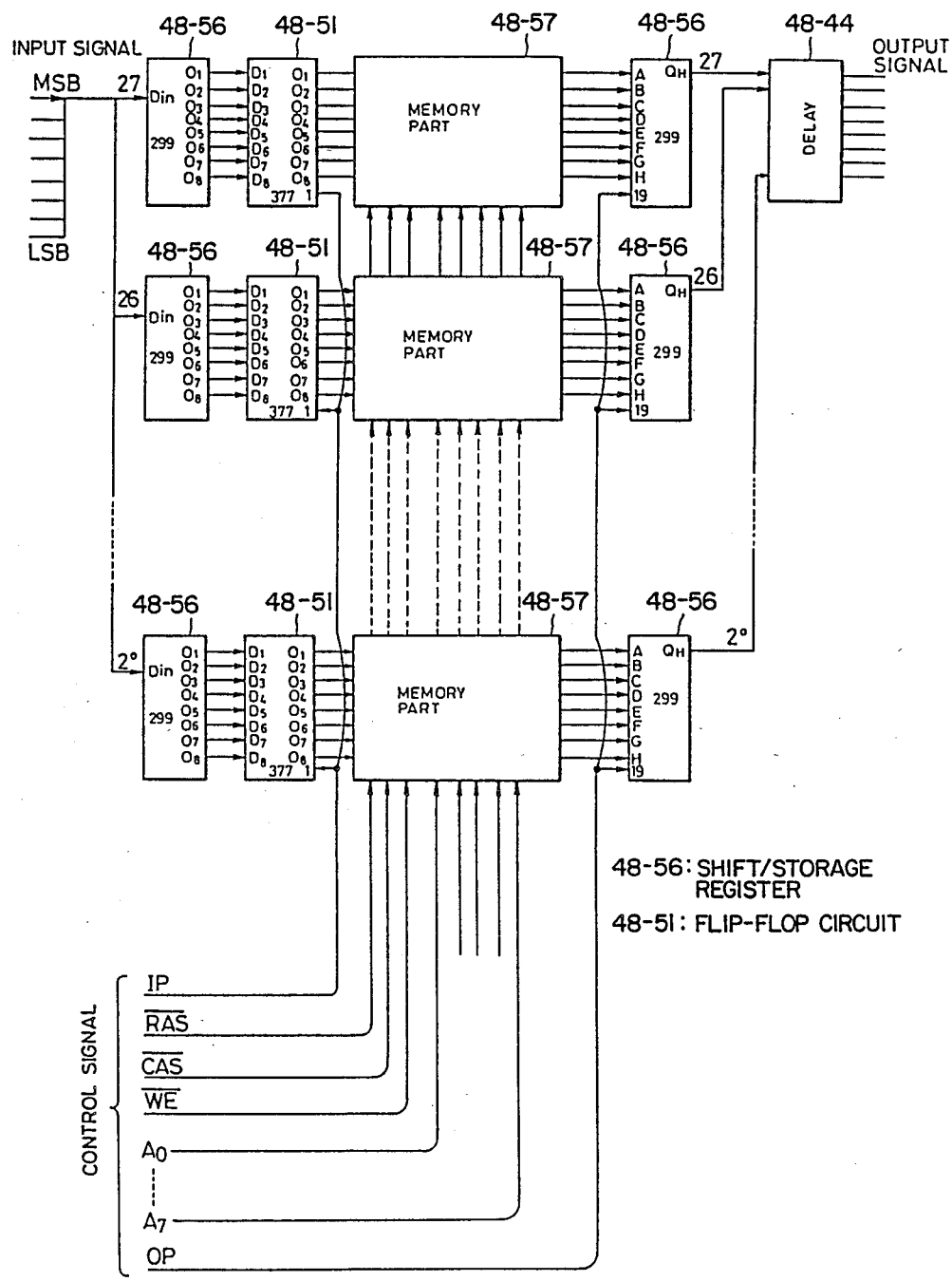
FIG. 48 is a block diagram illustrating one embodiment of 262H delay circuit.
Figure 49:
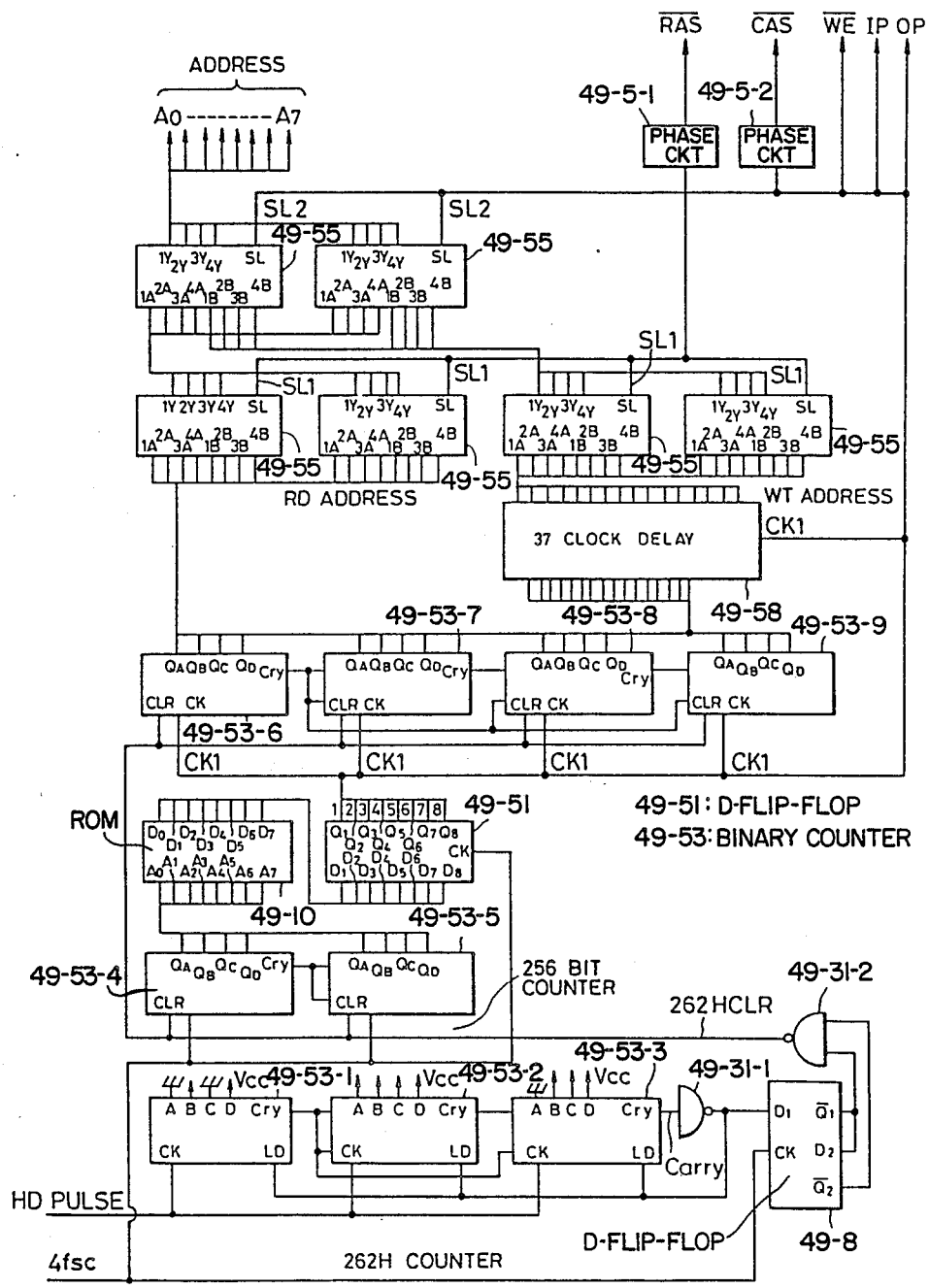
FIG. 49 is a block diagram illustrating one embodiment of the control signal generating circuit 48.

Finally, structures of the 261H, 262H and 263H delay circuits will be described in conjunction with FIGS. 48 to 50. FIG. 48 shows memory part, FIG. 49 shows a circuit for generating address signals and like signals to control the operation of the memory part, and FIG. 50 is a time chart of control signals.

First, the structure of memory part will be described in conjunction with FIG. 48. The input signals consist of time series data of a clock frequency of 4 $f_{sc}$. The input signals are input to shift/storage registers 56 (correspond to 74299) for each of the bits ranging from MSB through up to LSB. The output signals are latched by D-type flip-flop circuits 51 at a moment when the signal IP becomes 0. As shown in FIG. 25, the signal IP becomes 0 after every 8 clock period of 4 $f_{sc}$. Therefore, the bit signals of the 4 $f_{sc}$ time series are converted into parallel signals of 8 phases that serve as input data to memory parts 57 consisting of, for example, eight 64K×1 bit DRAM's. The output data of the memory parts 57, i.e., parallel signals of 8 phases are stored in the shift/storage registers 56 when the signal OP assumes the level 1 as shown in FIG. 50, and are converted into serial time series signals of 4 $f_{sc}$ by the operation of the shift registers when the signal OP assumes the level 0.

The signals converted into time series signals of 4 $f_{sc}$ for each of the bits are corrected by the delay circuit 44 for their delay by several clocks of 4 $f_{sc}$; i.e., there are obtained time series signals of 4 $f_{sc}$ that are just delayed by 261H, 262H or 262H.

Structure of signals for controlling the operation of the memory parts will now be described in conjunction with FIG. 49 which deals with the case of the 262H delay circuit.

Binary counters 53 are combined to constitute a 262H counter which operates on clocks of horizontal synchronizing signals HD. In response to carry signals generated maintaining a 262H period, 262HCLR signals having a pulse width corresponding to 4 $f_{sc}$ clock are generated through a D-type flip-flop 49-8 and a NAND circuit 49-31-2. The 262HCLR signals are input to clear terminals of binary counters 53. Output signals of a 256 bit counter which operates on 4 $f_{sc}$ clocks are used as address signals for a ROM 49-10, and output signals of the ROM 49-10 are latched by a D-type flip-flop 51 to generate signals that operate memory groups as shown in FIG. 50.

Binary counters 53-i (i=6 . . . 9) are operated on clocks $CK_1$ shown in FIG. 50 to generate addresses RD for reading the data from the memory part maintaining a 4 $f_{sc}$ 8 clock period. A three-clock delay circuit 58 delays the addresses RD by three clocks of $CK_1$ to form addresses WT for writing operation.

The memory part performs the writing operation and reading operation alternatingly at a period of 280 nsec (corresponds to 4 $f_{sc}$ four clocks) and, hence, the multiplexers 55 generate address signals as shown in FIG. 50.

On the other hand, control signals $\overline{RAS}$, $\overline{CAS}$ for the memory part are delayed through phase circuits 49-5-1 and 49-5-2 so that the memory part are properly operated.

The address WT is delayed by three clocks with respect to the address RD in order to reduce the amount of delay of the delay circuit 44 in the memory output part shown in FIG. 48.

By simply changing the load value of the binary counters which constitute the 262H counter, furthermore, it can be directly used as a circuit which generates signals to control the operation of the memory part relative to the 261H and 263H delay circuits.

According to the present invention, the signals of either the high-resolution television system having compatibility or of the existing television system can be received to form a picture of high quality, presenting great advantage.

According to the present invention, furthermore, the adaptive processing is carried out, i.e., the $Y_L$, C, $Y_H'$ separation and the scanning line interpolation processing are carried out using different motion informations. However, it is also allowable to carry out the adaptive processing relying only upon the detected motion information that was used, for example, in the $Y_L$, C, $Y_H'$ separation.

In the embodiments of the invention, furthermore, the scanning lines are interpolated after the signals are demodulated to luminance signals Y and color difference signals I, Q. However, it is also possible to perform the interpolation processing using video signals of the composite form in order to decrease the number of delay circuit elements (such as 262H delay circuits and the like).

According to the invention, high-resolution information is inserted in three-dimensional vacant frequency bands, thereby allowing high-resolution video information to be advantageously transmitted within the limits placed by the existing television signal standards, advantageously.

More specifically, by inserting a high-resolution luminance signal of 6 MHz, for example, into the signal frequency band of 4.2 MHz, a high-resolution television signal can be transmitted without modifying the existing broadcasting standards and the like.

Moreover, it becomes possible to display a high-resolution television picture while maintaining communicability by combining the technique of the invention with a technique of doubling the number of scanning lines on both the sending part and the receiving part, or only the receiving part or a technique of converting interlaced scanning into progressive scanning, thereby to increase the resolution in both horizontal and vertical directions.

What is claimed is:

1. A color television signal transmission system comprising:
    (a) sending means including first means for obtaining a luminance signal and a color signal of a video signal, first modulating means for modulating a first subcarrier by said color signal in order to obtain a modulated color signal, frequency converting means for converting one part of said luminance signal, which has a horizontal frequency higher than a predetermined horizontal frequency, into a first luminance signal having a horizontal frequency lower than said predetermined horizontal frequency and temporal-vertical frequencies different from temporal-vertical frequencies of said modulated color signal, and multiplexing means for multiplexing another part of said luminance signal having a horizontal frequency lower than said predetermined horizontal frequency, said modulated color signal and said first luminance signal in order to produce a multiplexed video signal of a color television signal to be transmitted;
    (b) transmission means for transmitting said multiplexed video signal within a horizontal frequency band lower than said predetermined horizontal frequency; and
    (c) receiving means for reproducing said luminance signal and said color signal from said multiplexed video signal and including motion detecting means for detecting motion information of a picture from said multiplexed video signal, separating means for separating said another part of said luminance signal, said first luminance signal and said modulated color signal in response to said detected motion information, first demodulating means for reproducing said color signal from said modulated color signal, and second demodulating means for reproducing said one part of said luminance signal from said first luminance signal;
    wherein said motion detecting means includes first motion detecting circuit means for detecting first motion information from a horizontal frequency component lower than the horizontal frequency of said modulated color signal and luminance signal of a frame difference signal between a first signal having motion which is to be detected and a second signal separated by a frame period from said first signal, and second motion detecting circuit means for detecting at least one of second motion information obtained from a sum of two of frame difference signals of two scanning lines vertically adjacent to a line on which said first signal is included and third motion information obtained from two frame difference signals on a scanning line having the same vertical position.

2. A color television signal transmission system according to claim 1, wherein said frequency converting means comprises:
    carrier generating means for generating a second subcarrier having a temporal-vertical frequency in line symmetry to a temporal-vertical frequency of said first subcarrier in a two dimensional frequency region represented by temporal and vertical frequency axes arranged perpendicular to each other;
    amplitude modulating means for modulating said second subcarrier by said one part of said luminance signal; and
    filter means for inputting an output signal of said amplitude modulating means and passing a frequency component having frequencies lower than said predetermined horizontal frequency.

3. A color television signal transmission system according to claim 2, wherein said modulated color signal and said another part of said luminance signal form a video signal of the NTSC color television system.

4. A color television receiver comprising:
    receiving means for receiving a multiplexed color television signal including a luminance signal, a modulated color signal and a modulated luminance signal having a temporal-vertical frequency different from a temporal-vertical frequency of said modulated color signal;
    first detecting means for detecting motion information of a picture from said multiplexed color television signal;
    separating means for separating said luminance signal, said modulated color signal and said modulated luminance signal in response to said detected motion information;
    first modulation means for demodulating said modulated luminance signal separated by said separating means and for producing a first luminance signal having a horizontal frequency higher than a predetermined horizontal frequency;

second demodulating means for demodulating said modulator color signal separated by said separating means and for producing a color difference signal;
interpolation circuit means for forming an interpolated luminance signal and an interpolated color difference signal from said luminance signal, said first luminance signal and said color difference signal in response to said detected motion information; and
converting means for converting said luminance signal, said first luminance signal, said color difference signal and output signals of said interpolation circuit means into sequentially scanned video signals;
wherein said first detecting means includes first motion detecting circuit means for detecting first motion information from a horizontal frequency component lower than the horizontal frequency of said modulated color signal and luminance signal of a frame difference signal between a first signal having motion which is to be detected and a second signal separated by a frame period from said first signal, and second motion detecting circuit means for detecting at least one of second motion information obtained from a sum of two of frame difference signals of two scanning lines vertically adjacent to a line on which said first signal is included and third motion information obtained from two frame difference signals on a scanning line having the same vertical position.

5. A color television receiver according to claim 4, wherein said modulated luminance signal is a signal including a second subcarrier having a temporal-vertical frequency in line symmetry with a temporal-vertical frequency of a first subcarrier of said modulated color signal in a two dimensional frequency region represented by temporal and vertical frequency axes arranged perpendicular to each other, and a luminance signal modulated by said second subcarrier and a color signal modulated by said first subcarrier.

6. A color television receiver according to claim 5, wherein said luminance signal and said modulated color signal form a video signal of the NTSC color television system.

* * * * *